(12) United States Patent
Zhao et al.

(10) Patent No.: US 11,251,819 B1
(45) Date of Patent: Feb. 15, 2022

(54) THERMAL EFFECT MITIGATION FOR DIGITAL PRE-DISTORTION

(71) Applicant: XILINX, INC., San Jose, CA (US)

(72) Inventors: Hongzhi Zhao, Los Gatos, CA (US); Xiaohan Chen, Sunnyvale, CA (US); Hemang Parekh, San Jose, CA (US); Vincent C. Barnes, El Paso, TX (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 17/133,505

(22) Filed: Dec. 23, 2020

(51) Int. Cl.
*H04B 1/04* (2006.01)

(52) U.S. Cl.
CPC ... *H04B 1/0475* (2013.01); *H04B 2001/0425* (2013.01)

(58) Field of Classification Search
CPC .......... H04B 1/0475; H04B 2001/0425; H04B 1/04; H04B 2001/0408
USPC .................................................. 375/295–297
See application file for complete search history.

(56) References Cited

U.S. PATENT DOCUMENTS

| | | | | |
|---|---|---|---|---|
| 2005/0157814 A1* | 7/2005 | Cova | ..................... | H03F 1/3247 375/297 |
| 2005/0195919 A1* | 9/2005 | Cova | ..................... | H03F 1/3294 375/297 |
| 2006/0240786 A1* | 10/2006 | Liu | ..................... | H03F 1/3247 455/114.3 |
| 2008/0152037 A1* | 6/2008 | Kim | ..................... | H04W 40/00 375/297 |
| 2011/0204975 A1* | 8/2011 | Miyashita | ............. | H03F 1/3258 330/149 |
| 2012/0034887 A1* | 2/2012 | McCallister | .......... | H03F 1/3241 455/127.1 |
| 2012/0154038 A1* | 6/2012 | Kim | ..................... | H04L 27/2626 330/149 |
| 2016/0308577 A1* | 10/2016 | Molina | ............. | H04L 25/03012 |
| 2017/0353163 A1* | 12/2017 | Gazneli | ................. | H03F 1/3247 |
| 2018/0331662 A1* | 11/2018 | Maa | ..................... | H03F 1/3258 |
| 2020/0169334 A1* | 5/2020 | Li | ............................. | H03F 1/32 |

* cited by examiner

*Primary Examiner* — Emmanuel Bayard
(74) *Attorney, Agent, or Firm* — Patterson + Sheridan, LLP

(57) ABSTRACT

A transmitter for a communication system comprises a digital pre-distortion (DPD) circuit configured to generate a digital intermediate signal by compensating an input signal for distortions resulting from an amplifier, and an adaptation circuitry configured to update the first parameter based on the adjustment signal, the input signal, and an output signal output by the amplifier and based on the digital intermediate signal. The DPD circuit includes an infinite impulse response filter configured to implement a transfer function based on a first parameter, and thermal tracking circuitry configured to generate an adjustment signal corresponding to a thermal change of the amplifier.

17 Claims, 10 Drawing Sheets

US 11,251,819 B1

THERMAL EFFECT MITIGATION FOR DIGITAL PRE-DISTORTION

TECHNICAL FIELD

Examples of the present disclosure generally relate to digital communication circuits and systems and, in particular, to digital communication circuits implementing digital pre-distortion (DPD) processing and systems including such circuits.

BACKGROUND

Power amplifiers are generally used in communication systems, such as wireless communication systems, to provide a gain to a signal that is being transmitted. Further, power amplifiers can provide a mechanism for load matching of the medium on which a signal is to be transmitted. However, the linearity of the output of power amplifiers used in communication systems may be relatively limited, reducing performance of the communication systems. In many instances, digital pre-distortion (DPD) can be used to enhance linearity of the output response of a power amplifier.

SUMMARY

Examples described herein provide for digital communication circuits and systems that implement digital pre-distortion (DPD). The DPD can be implemented with, among other things, one or more infinite impulse response (IIR) filters that adaptively implements a parameter in the transfer function of the respective IIR filter. In some examples, by adaptively implementing parameters, non-linearities caused by an amplifier having different time constants based on thermal changes of the amplifier can be compensated, improving the linearity of a pre-distorted signal.

In one example, a transmitter for a communication system comprises a digital pre-distortion (DPD) circuit configured to generate a digital intermediate signal by compensating an input signal for distortions resulting from an amplifier, and an adaptation circuitry configured to update the first parameter based on the adjustment signal, the input signal, and an output signal output by the amplifier and based on the digital intermediate signal. The DPD circuit includes an infinite impulse response (IIR) filter configured to implement a transfer function based on a first parameter, and thermal tracking circuitry configured to generate an adjustment signal corresponding to a thermal change of the amplifier.

In one example, a method of processing for transmission comprises performing digital pre-distortion on an input signal to generate a digital intermediate signal. Performing the digital pre-distortion comprises outputting a first signal from an IIR filter. The first signal is based on the input signal passed through the IIR filter. The transfer function of the IIR filter is based on a first parameter. Performing the digital pre-distortion further comprises generating an adjustment signal corresponding to a change in an operating temperature of an amplifier configured to generate an output signal based on the digital intermediate signal. Further, performing the digital pre-distortion comprises updating the first parameter based on the adjustment signal, the input signal, and an output signal output by the amplifier and based on the digital intermediate signal.

In one example, a communication system comprises a transmitter. The transmitter is configured to receive an input signal to be transmitted via an antenna. The transmitter comprises a power amplification unit. The power amplification unit comprising an amplifier, a DPD circuit, and adaptation circuitry configured to update the first parameter based on the adjustment signal, the input signal, and an output signal output by the amplifier and based on the digital intermediate signal. The DPD circuit is configured to generate a digital intermediate signal by compensating the input signal for distortions resulting from the amplifier and to communicate the digital intermediate signal towards the amplifier. The DPD circuit includes an IIR filter configured to implement a transfer function based on a first parameter, and thermal tracking circuitry configured to generate an adjustment signal corresponding to a change in an operating temperature of the amplifier.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
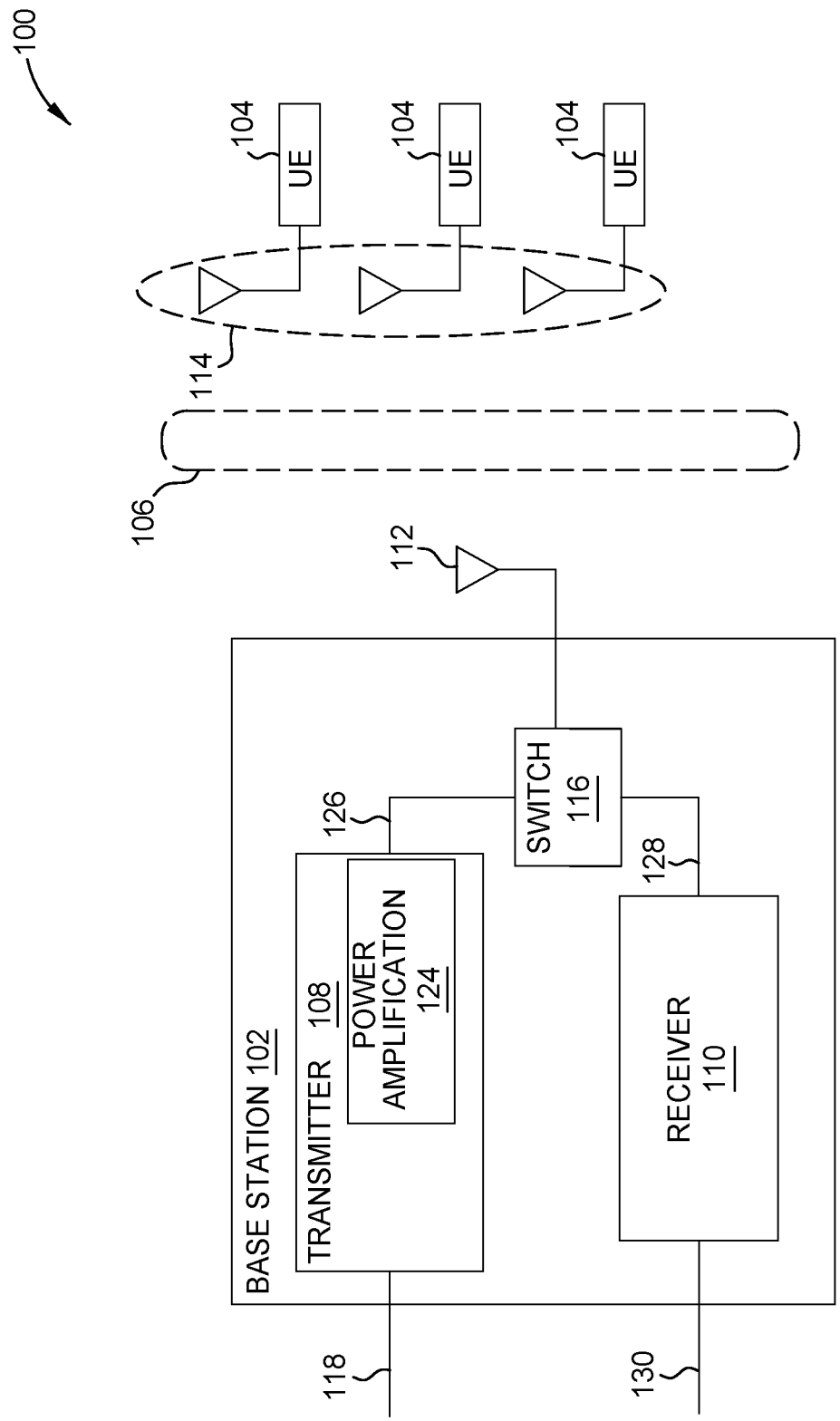
FIG. 1 is a block diagram depicting an example communication system where a power amplification unit including a digital pre-distortion (DPD) system may be used according to some examples.

Examples described herein provide for digital communication circuits and systems that implement digital pre-distortion (DPD). The DPD can be implemented with, among other things, one or more infinite impulse response (IIR) filters that adaptively implement parameters in the respective transfer function of the IIR filter. In some examples, by adaptively implementing parameters, non-linearities caused by an amplifier having different time constants based on differing modes and thermal changes of the amplifier can be mitigated (e.g., compensated). Accordingly, a signal is pre-distorted in a manner such that differences between a corresponding received signal and the original signal are reduced.

Generally, DPD processing is implemented to compensate for a non-linear response of an amplifier used in communications. Power amplifiers (PAs) are typically implemented in communication systems and are inherently non-linear. Non-linearities in PAs cause spectral growth beyond the signal bandwidth of a particular channel, which interferes with adjacent channels. Further, the non-linearities in PAs cause distortions within the signal bandwidth, causing an increased bit error rate at a receiver. In, for example, a gallium nitride (GaN) based PA, distortions can be caused by thermal effects and/or trapping effects. Trapping effects in a GaN PA vary as the temperature of the PA changes.

In some examples, a DPD system can, in compensating for effects in PAs, compensate for thermal effects of a PA. Some examples can implement one or more IIR filters in a DPD circuit. A parameter is adaptively implemented in the transfer function of the IIR filter to compensate for thermal effects. For example, the parameters of the IIR filter are associated with the material characteristics of the PA device. As the material characteristics of the PA device change with the device's temperature, the parameters of the IIR filter change and introduce additional non-linearities. Accordingly, by tracking the changes in the parameters, the DPD circuit can compensate for non-linearities caused by the changing thermal effects, and the DPD can pre-distort a signal to be transmitted to effectively extend a linear response of the amplifier.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described. Further, methods described herein may be described in a particular order of operations, but other methods according to other examples may be implemented in various other orders (e.g., including different serial or parallel performance of various operations) with more or fewer operations.

FIG. 1 is a block diagram depicting an example communication system 100 where a power amplification unit (e.g., power amplification unit 124) including a DPD system may be used. The communication system 100 includes a base station 102 and user equipment (UE) units 104. Each of the UE units 104 includes an antenna 114. The base station 102 includes transmitter 108, receiver 110, switch 116, and an antenna 112. One or more UE unit 104 is communicatively coupled to the base station 102 at a time. The UE units 104 may be communicatively coupled to the base station 102 via an over-the-air (e.g., wireless) communication channel 106 using the antennas 112 and 114.

In some examples, the communication system 100 is for bidirectional communication, namely a downlink for sending information from the base station 102 to one or more UE units 104, and an uplink for sending information from one or more UE units 104 to the base station 102.

The transmitter 108 receives an input signal at an input node 118 for transmission. The transmitter 108 includes the power amplification unit 124 and generates a signal at output node 126. The power amplification unit 124 amplifies a signal to be transmitted. The signal on the output node 126 is then sent, via the switch 116, to the antenna 112 for transmission. The power amplification unit 124 drives the antenna 112 for transmitting the signal on the output node 126 via the communication channel 106.

The receiver 110 receives a signal at an input node 128 from the antenna 112 via the switch 116. The receiver 110 performs an uplink process and outputs a signal on an output node 130.

The communication system 100 may deploy various transmission schemes, for example, frequency division duplex (FDD) and time division duplex (TDD). In some examples TDD (e.g., according to a TDD-Long-Term Evolution (LTE) standard) is deployed. In such example, the uplink is separated from downlink by the allocation of different time slots for uplink and downlink in the same frequency band. With reference to FIG. 1, in such examples, the switch 116 functions a duplexer and may be used to switch between uplink and downlink according to the allocated time slots. Time slots allocated to downlink may be referred to as transmit time slots, and time slots allocated to uplink may be referred to as receive time slots.

Figure 2:
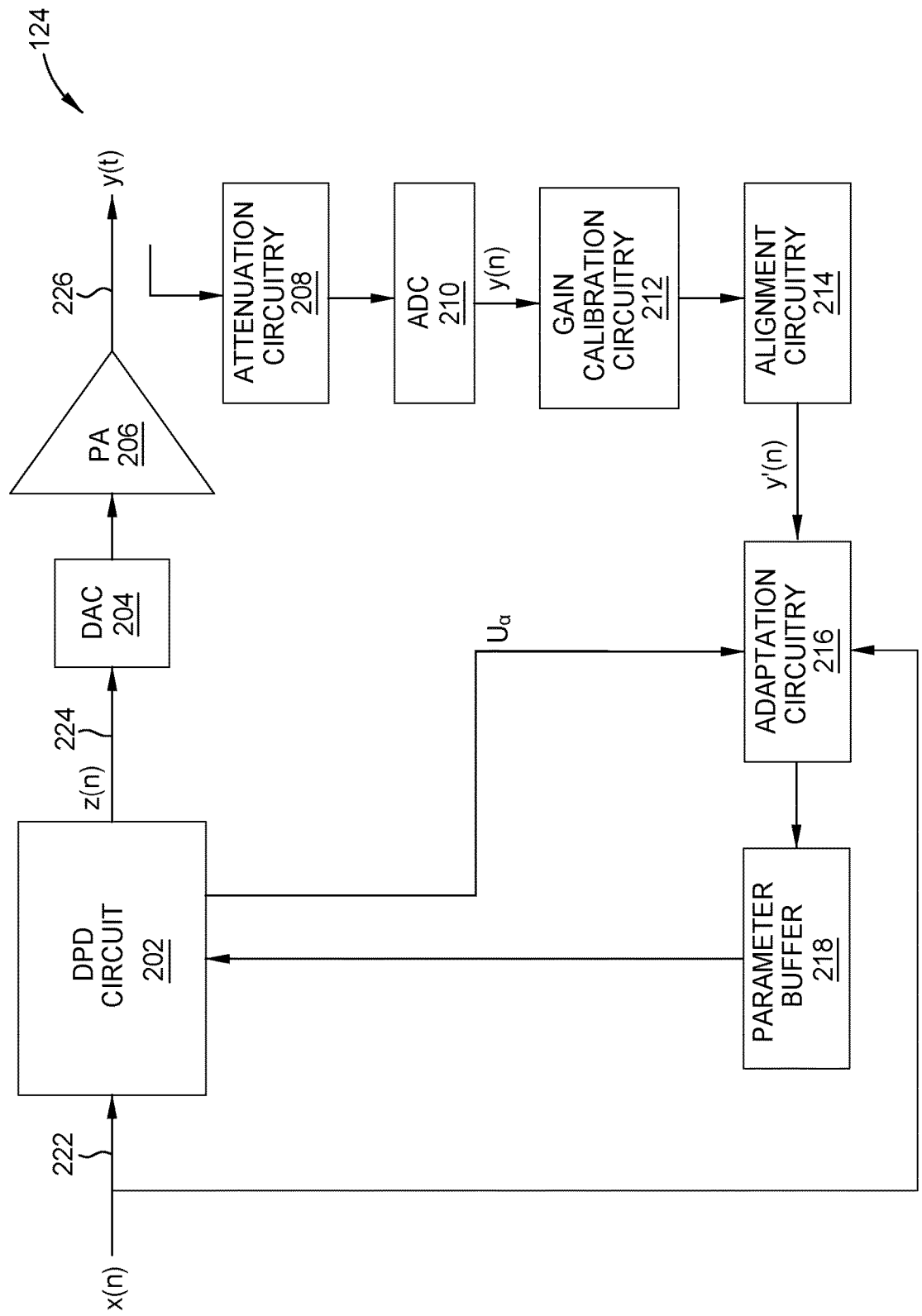
FIG. 2 illustrates an example power amplification unit including a DPD circuit for compensating for distortion according to some examples.

FIG. 2 illustrates an example power amplification unit 124 including a DPD circuitry 202 for compensating for distortion. The power amplification unit 124 includes the DPD circuitry 202, a digital-to-analog converter (DAC) 204, a power amplifier (PA) 206, attenuation circuitry 208, an analog-to-digital converter (ADC) 210, gain calibration circuitry 212, an alignment circuitry 214, an adaptation circuitry 216, and a parameter buffer 218. Other components may be included in the power amplification unit 124 that are not illustrated in FIG. 2 for clarity. For example, radio frequency (RF) mixers can be included to step-up and/or step down signals to and/or from an RF signal. Generally, the DPD circuit, the DAC 204, and the PA 206 are electrically connected to receive a digital input signal x(n), process the digital input signal x(n), and generate and transmit an analog output signal y(t). Generally, the attenuation circuitry 208, the ADC 210, the gain calibration circuitry 212, the alignment circuitry 214, the adaptation circuitry 216, and the parameter buffer 218 form a feedback path to determine parameters implemented by the DPD circuitry 202.

The DPD circuitry 202 receives the digital input signal x(n) at an input node 222 of the DPD circuitry 202 and generates a digital intermediate signal z(n) on an output node of the DPD circuitry 202. The output node of the DPD circuitry 202 is an intermediate node 224 of the power amplification unit 124. The digital intermediate signal z(n) is a modified version of the digital input signal x(n). For example, the digital intermediate signal z(n) is a distorted version of the digital input signal x(n) that pre-distorts the digital input signal x(n) to compensate for distortions introduced by the PA 206. Further, the DPD circuitry 202 generates digital filtered signal $z_{IIR}(n)$ and digital response signal $r_{IIR}(n)$. Details with regard to generating the digital filtered signal $z_{IIR}(n)$ and the digital response signal $r_{IIR}(n)$ are provided in greater detail in the following description with regard to FIGS. 5 and 6.

The output node of the DPD circuitry 202 is coupled to an input node of the DAC 204. The DAC 204 receives the digital intermediate signal z(n) at the input node of the DAC 204, converts the digital intermediate signal z(n) to an analog signal, and outputs the analog version of the digital intermediate signal z(n) on an output node of the DAC 204. The output node of the DAC 204 is coupled to an input node of the PA 206. Further, the adaptation signal $u_\alpha$ is provided to the adaptation circuitry 216 via another output node of the DPD circuitry 202. Generation of the adjustment signal $u_\alpha$ is described in greater detail in the following.

The PA 206 receives the analog version of the digital intermediate signal z(n) at the input node of the PA 206. In other examples, the PA 206 receives another signal based on the digital intermediate signal z(n), such as an RF signal that is the digital intermediate signal z(n) stepped up to a RF. The PA 206 applies a gain to the signal, and outputs the analog output signal y(t) on an output node of the PA 206. The output node of the PA 206 is the output node 226 of the power amplification unit 124.

At least a portion of the analog output signal y(t) output by the PA 206 on the output node 226 is fed back to an input node of the attenuation circuitry 208. For example, a fraction of the analog output signal y(t) is fed back to the input node of the attenuation circuitry. The attenuation circuit 208 receives the analog output signal y(t) at an input node of the attenuation circuitry 208. The attenuation circuit 208 attenuates the analog output signal y(t) and outputs an attenuated analog output signal to an input node of the ADC 210. The ADC 210 converts the attenuated analog output signal to a digital output signal y(n), and outputs the digital output signal y(n) on an output node of the ADC 210. The output node of the ADC 210 is electrically connected to an input node of gain calibration circuitry 212. The gain calibration circuitry 212 mitigates error within the digital output signal y(n) introduced by the ADC 210, and outputs the error mitigated digital output signal to the alignment circuitry 214 via an output node of the gain calibration circuitry 212.

In one or more of the examples, one or more of the attenuation circuitry 208 and the gain calibration circuitry 212 is omitted.

The alignment circuitry 214 receives the digital output signal y(n), matches the amplitude, delay, and/or phase variations of the digital output signal y(n) to the digital signal x(n) or the digital intermediate signal z(n), and generates an aligned digital output signal y'(n). The alignment circuitry 214 includes a mixer to mix a detected phase difference in the digital output signal y(n) to generate the aligned digital output signal y'(n). The alignment circuitry 214 outputs the aligned digital output signal y'(n) on an output node of the alignment circuitry 214, which is electrically connected to an input node of the adaptation circuitry 216.

The adaptation circuitry 216 is configured to capture a predetermined number of samples of data of the aligned digital output signal y'(n) (e.g., by using a sampling coupler). The adaptation circuitry 216 has input nodes electrically connected to the input node 222 and output node or nodes of the DPD circuitry 202. The adaptation circuitry 216 captures a predetermined number of samples of data of the digital filtered signal $z_{IIR}(n)$ and the digital response signal $r_{IIR}(n)$ (e.g., by using one or more sampling couplers). The adaptation circuitry 216 captures a predetermined number of samples of data of the digital input signal x(n) on the input node 222 (e.g., by using a sampling coupler). The adaptation circuitry 216 determines parameters of the DPD circuitry 202 based on the digital input signal x(n), digital filtered signal $z_{IIR}(n)$, digital response signal $r_{IIR}(n)$, and/or aligned digital output signal y'(n). In some examples, the parameters may be stored in the parameter buffer 218, and provided to the DPD circuitry 202. The parameters may be coefficients of various functions, for example, functions that modify the digital input signal x(n), such that the digital intermediate signal z(n) of the DPD circuitry 202 compensates for the distortion of the PA 206 in response to thermal changes of the power amplification unit 124.

In some examples, the power amplification unit 124 includes a mixer (e.g., an up converter) coupled between the output node of the DAC 204 and the input node of the PA 206. In some examples, an up converter receives the analog signal from the DAC 204 and converts the analog signal to an RF analog signal, which is then provided to the PA 206. The PA 206 provides an amplified RF output signal. In some examples, the power amplification unit 124 includes a mixer (e.g., a down converter) to convert the RF output signal to an intermediate frequency (IF) or baseband (BB) analog signal that is sampled to generate a digital sampled signal. The digital sampled signal is provided to the input node of the alignment circuitry 214 or adaptation circuitry 216.

In various examples, the adaptation circuitry 216 uses various numerical techniques for generating the parameters used in the DPD circuitry 202. For example, discrete characterization events, where the coefficients are found that best match the PA 206 during some period of samples may be employed. For further example, least mean squares estimation over a fixed block of samples may be used. However, any suitable method for generating parameters for a DPD circuitry 202 may be used.

In various examples, the adaptation circuitry 216 provides one or more updated parameters in response to thermal changes. For example, the adaptation circuitry 216 increases the values of one or more of the parameters in response to an increase in temperature of the power amplification circuit 124.

In various examples, the DPD circuitry 202 is implemented based on PA behavior models (also referred to as PA models) of the PA 206. After determining the PA models which model the non-linearity of the PA 206, the inverse of such PA models may be applied to the digital input signal x(n) by the DPD circuitry 202, thereby compensating for the non-linearity of the PA 206.

In some examples, the PA model is a memoryless PA model without any memory effect. Such memoryless model may include, for example, a polynomial model and Saleh's model. A DPD path implemented based on such a memoryless PA model may be referred to as a memoryless DPD path.

In some examples, the PA model is a memory PA model which considers memory effects of the PA. Memory effects of the PA may be classified as short term memory effects and long term memory effects according to time constants of the memory effects. In some examples, short term memory effects may have time constants of the order of carrier signal period (e.g., several times of the carrier signal period). In some examples, time constants of the short-term memory effects are of the order of nanoseconds. Long term memory effects may have a lower frequency (e.g., in a range between a few kilohertz (kHz) to megahertz (MHz)) and/or larger time constants than those of short term memory effects. In some examples, time constants of the long-term memory effects are of the order of microseconds, milliseconds, or greater.

In some examples, a PA model with short term memory effects may include, for example, memory polynomial model and Volterra model. A DPD path implemented based on such a PA model with short term memory effect may be referred to as a short term memory effect DPD path.

In some examples, a DPD path implemented based on such a PA model with long term memory effects may be referred to as a long term memory effect DPD path. Such a DPD path may include one or more IIR filters to compensate for the long term memory effects of the PA.

In some examples, the PA 206 is associated with one or more PA models including, for example, memoryless PA model, PA model with short term memory effects, PA model with long term memory effects, or a combination thereof.

The DPD circuitry 202 may include a plurality of parallel DPD paths, where the DPD paths correspond to the plurality of PA models respectively. In an example, DPD circuitry 202 includes a plurality of parallel DPD paths including, for example, memoryless DPD path, short term memory effect DPD path, and/or long term memory effect DPD path.

In some examples, the PA 206 can be a gallium nitride (GaN) based PA, and the DPD circuitry 202 may be configured to compensate for long term memory effects of the GaN based PA. The GaN based PA can include a GaN high electron mobility transistor (GaN-HEMT). A GaN-HEMT may show long term memory effects due to its deep electron trap effects, where the density of its traps may change versus the output power of the GaN based PA. In some examples, a communication system using a GaN based PA is an LTE-TDD system. In such a communication system, the GaN based PA may be turned on during downlink time slots, and be turned off during uplink time slots. After the GaN based PA is turned on during downlink time slots, the deep electron traps may experience slow charging and discharging processes. As such, a non-linear behavior model of the GaN based PA changes slowly during this turning-on time period (transient period), even when the PA output power is constant. Further, while operating, the GaN PA semiconductor material characteristics change based on the changes to the power amplification 124. Accordingly, the non-linear behavior model of the GaN based PA experiences additional changes.

In some examples and as described in additional detail below, IIR filters can be implemented in the DPD circuitry 202 to model the non-linear gain changes of the GaN based PA over the PA output power and the thermal effects and/or trapping effects of the GaN based PA. The long term memory effects of the GaN based PA may include, for example, a gate-lag effect, a drain-lag effect, and a thermal effect. A GaN based PA may have a plurality of long term memory effects (e.g., a gate lag effect and a drain lag effect) associated with the electron traps, because a plurality of energy levels may be involved in the trapping effects of the GaN based PA. As the operating temperature of the power amplification 124 increases, the thermal effects due to the change in the operating temperature alter the long term memory effects of the GaN based PA. Different IIR filters may be configured to compensate for different memory effects of the GaN based PA.

Additionally, non-linearity effects of a GaN based PA can result from changing time constants of responses of the GaN based PA due to the gate-lag effect and drain-lag effect. The gate-lag effect and drain-lag effect have been modeled in a gate-lag model and a drain-lag model, respectively. These models show that small signal responses of a GaN based PA can vary based on voltages applied in the PA. In these models, an RC time constant can change, which can, during operation, change a transfer function of the GaN based PA and introduce non-linearities.

Figure 3:
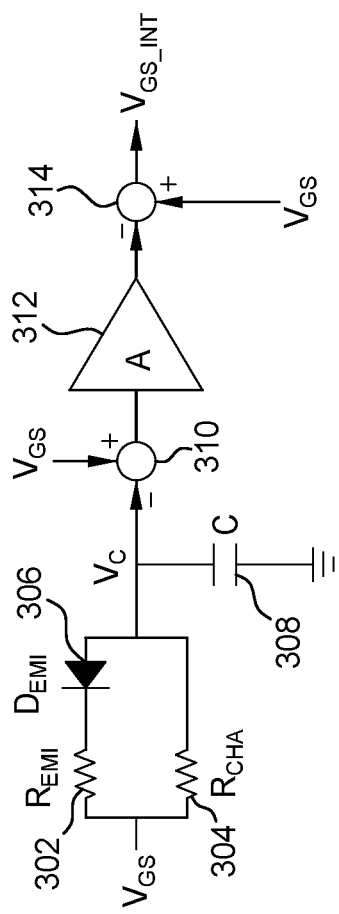
FIG. 3 illustrates a gate-lag model of a gallium nitride (GaN) based power amplifier (PA).

FIG. 3 illustrates a gate-lag model of a GaN based PA. An input node, on which a source-to-gate voltage $V_{GS}$ is applied, is connected to respective first terminals of resistor ($R_{EMI}$) 302 and resistor ($R_{CHA}$) 304. The second terminal of the resistor 302 (opposite from the first terminal) is connected to a cathode of a diode ($D_{EMI}$) 306. The second terminal of the resistor 304 (opposite from the first terminal) is connected to a anode of the diode 306, which is further connected to a first terminal of a capacitor (C) 308 and a negative input node of an subtractor 310. A capacitor voltage $V_C$ is on the node to which the anode of the diode 306, second terminal of the resistor 304, first terminal of the capacitor 308, and negative input node of the subtractor 310 are connected. A second terminal of the capacitor 308 is connected to a ground node. The source-to-gate voltage $V_{GS}$ is applied to a positive input node of the subtractor 310. An output node of the subtractor 310 is connected to an input node of an amplifier 312. An output node of the amplifier 312 is connected to a negative input node of a subtractor 314. The source-to-gate voltage $V_{GS}$ is applied to a positive input node of the subtractor 314. An output node of the subtractor 314 is an output node of the model on which an intermediate source-to-gate voltage $V_{GS\_INT}$ is applied.

As can be seen from this model in FIG. 3, whether the resistor ($R_{EMI}$) 302 forms part of the effective resistance of the model, and hence, forms part of the RC time constant of the model, depends on whether the source-to-gate voltage $V_{GS}$ is less than the capacitor voltage $V_C$. The capacitor 308 models the charge trapping effect in the model, and accumulated charge on the capacitor 308 results in the capacitor voltage $V_C$. An emission mode occurs when the source-to-gate voltage $V_{GS}$ is less than the capacitor voltage $V_C$ such that previously accumulated charge on the capacitor 308 is discharged. When the source-to-gate voltage $V_{GS}$ is less than the capacitor voltage $V_C$ in an emission mode, the diode 306 is conducting, and the effective resistance of the model is the resistance formed by the resistor (Ram) 302 and resistor ($R_{CHA}$) 304 being connected in parallel. A charging mode occurs when the source-to-gate voltage $V_{GS}$ is greater than the capacitor voltage $V_C$ such that the capacitor 308 accumulates charge. When the source-to-gate voltage $V_{GS}$ is not less than the capacitor voltage $V_C$ in a charging mode, the diode 306 is not conducting, and the effective resistance of the model is the resistance of resistor ($R_{CHA}$) 304. Mathematically, this can be generally expressed for a time constant $\tau$ as follows:

$$V_{GS} < V_C : \tau = \tau_{EMI} = (R_{CHA} \| R_{EMI}) * C$$

$$V_{GS} \geq V_C : \tau = \tau_{CHA} = R_{CHA} * C$$

Figure 4:
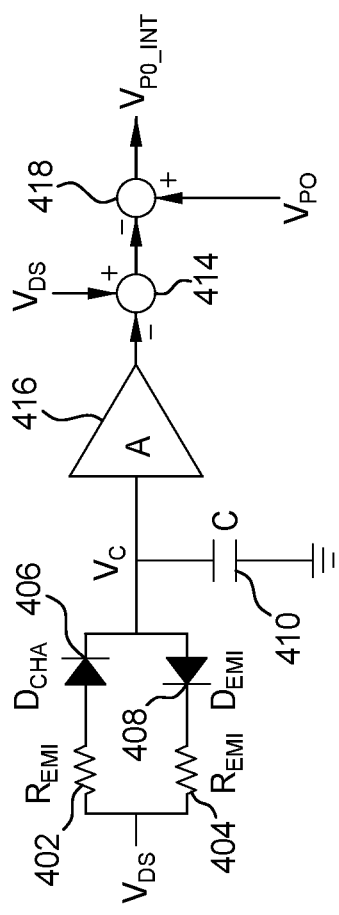
FIG. 4 illustrates a drain-lag model of a GaN based PA.

FIG. 4 illustrates a drain-lag model of a GaN based PA. An input node, on which a drain-to-source voltage $V_{DS}$ is applied, is connected to respective first terminals of resistor ($R_{CHA}$) 402 and resistor ($R_{EMI}$) 404. The second terminal of the resistor 402 (opposite from the first terminal) is connected to an anode of a diode ($D_{CHA}$) 406. The second terminal of the resistor 404 (opposite from the first terminal) is connected to a cathode of a diode ($D_{EMI}$) 408. A cathode of the diode 406 is connected to an anode of the diode 408, which is further connected to a first terminal of a capacitor (C) 410 and an input node of an amplifier 412. A capacitor voltage $V_C$ is on the node to which the cathode of the diode 406, anode of the diode 408, first terminal of the capacitor 410, and input node of an amplifier 412 are connected. A second terminal of the capacitor 410 is connected to a ground node. An output node of the amplifier 412 is connected to a negative input node of a subtractor 414. The drain-to-source voltage $V_{DS}$ is applied to a positive input node of the subtractor 414. An output node of the subtractor 414 is connected to an input node of an amplifier 416. An output node of the amplifier 416 is connected to a negative input node of a subtractor 418. A voltage $V_{P0}$ is applied to a positive input node of the subtractor 418. An output node of the subtractor 418 is an output node of the model on which an intermediate voltage $V_{P0\_INT}$ is applied.

As can be seen from this model in FIG. 4, whether the resistor ($R_{CHA}$) 402 and resistor ($R_{EMI}$) 404 form part of the effective resistance of the model, and hence, forms part of the RC time constant of the model, depends on whether the drain-to-source voltage $V_{DS}$ is less than or greater than the capacitor voltage $V_C$. The capacitor 410 models the charge trapping effect in the model, and accumulated charge on the capacitor 410 results in the capacitor voltage $V_C$. An emission mode occurs when the drain-to-source voltage $V_{DS}$ is less than the capacitor voltage $V_C$ such that previously accumulated charge on the capacitor 410 is discharged. When the drain-to-source voltage $V_{DS}$ is less than the capacitor voltage $V_C$ in an emission mode, the diode 406 is not conducting, and the diode 408 is conducting. Under such circumstances, the effective resistance of the model is the resistance of the resistor ($R_{EMI}$) 404. A charging mode occurs when the drain-to-source voltage $V_{DS}$ is greater than the capacitor voltage $V_C$ such that the capacitor 410 accumulates charge. When the capacitor voltage $V_C$ is less than drain-to-source voltage $V_{DS}$ in a charging mode, the diode 406 is conducting, and the diode 408 is not conducting. Under such circumstances, the effective resistance of the model is the resistance of resistor ($R_{CHA}$) 402. Mathematically, this can be generally expressed for a time constant $\tau$ as follows:

$$V_{DS} < V_C : \tau = \tau_{EMI} = R_{EMI} * C$$

$$V_{DS} > V_C : \tau = \tau_{CHA} = R_{CHA} * C$$

Figure 5:
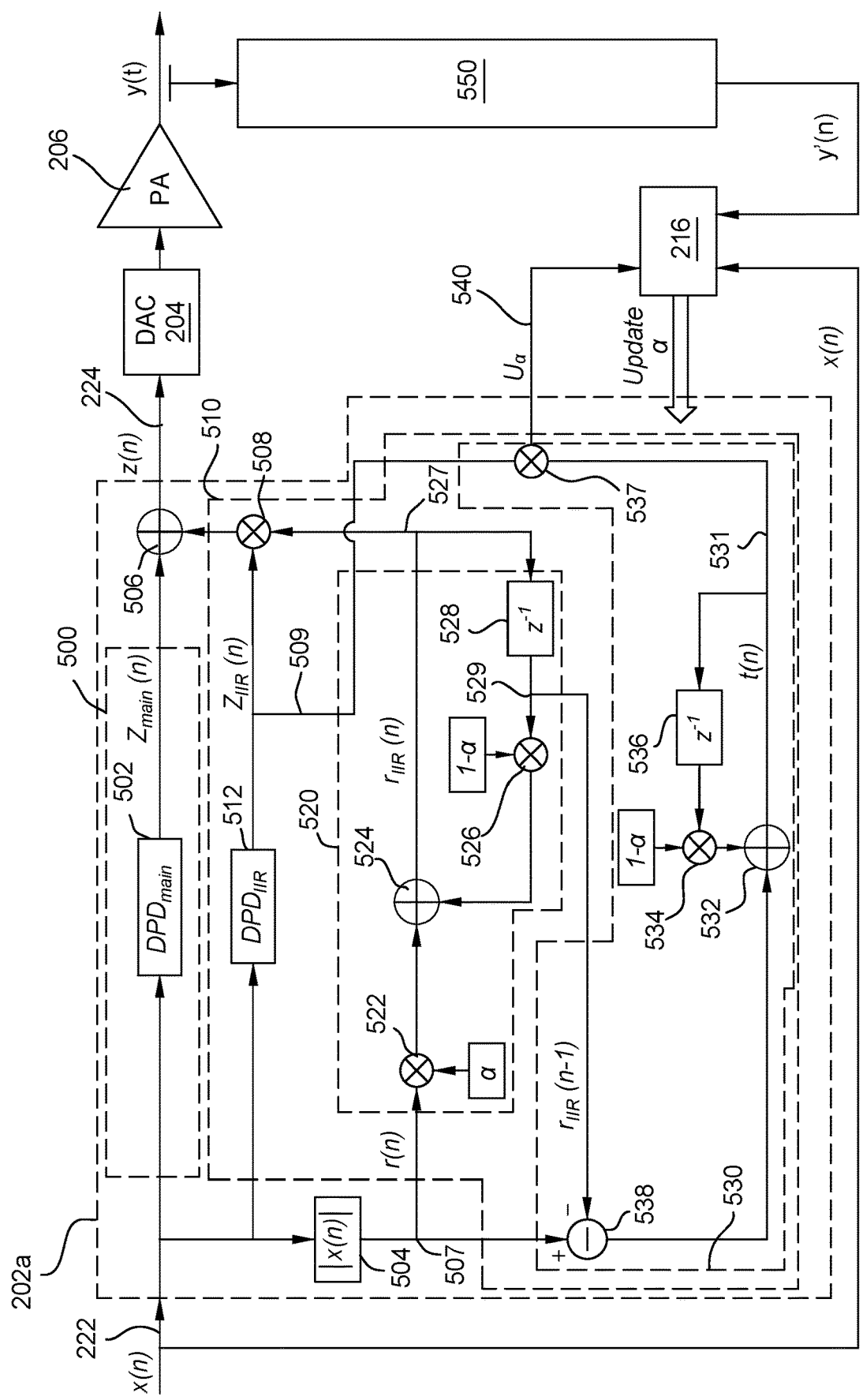
FIG. 5 is a schematic of DPD circuits that can be implemented as a DPD circuit according to some examples.

FIG. 5 illustrates DPD circuitry 202a implemented to compensate for effects in the PA 206. The DPD circuitry 202a pre-distorts a signal according to a predetermined model, and the signals output by paths of the DPD circuitry 202a are multiplied and/or summed to form the digital intermediate signal z(n). In the example of FIG. 5, the DPD circuitry 202a includes two parallel DPD paths 500 and 510. In other examples, the DPD circuitry 202a may include more than two parallel DPD paths. Further, the DPD circuitry 202a includes magnitude logic 504 and an adder 506.

The DPD path 500 compensates for short term memory effects of the PA 206. The DPD path 500 may also be referred to as main DPD path. The DPD path 500 includes DPD sub-circuit 502. An input node of the DPD sub-circuit 502 receives the input signal x(n) via the input node 222 input node, and an output node of the DPD sub-circuit 502 is electrically connected to an input node of the adder 506.

The DPD sub-circuit 502 receives the digital input signal x(n) and processes the digital input signal x(n) to compensate for the short term memory effects. The DPD sub-circuit 502 outputs a distorted signal $z_{main}$(n) to the respective input node of the adder 506. The DPD sub-circuit 502 may be implemented based on a memory polynomial model to compensate for short term memory effects of the PA 206. Such short term memory effects may be caused by reactive components of active devices and matching networks of the PA 206.

The adaptation circuit 216 adaptively configures the DPD sub-circuit 502 (e.g., to model the short term memory effects of the PA 206) via one or more parameters and/or coefficients of the DPD sub-circuit 502. The one or more parameters and/or coefficients may be stored within the parameter buffer 218. For example, one or more parameters may include one or more coefficients for a memory polynomial model used by the DPD sub-circuit 502.

The magnitude logic 504 and the DPD path 510 compensate for long term memory effects of the PA 206 and changes to effective time constants of the PA 206.

An input node of the magnitude logic 504 is electrically coupled to the input node 222 and receives the digital input signal x(n). The magnitude logic 504 generates a magnitude signal r(n) (or |x(n)|) from the digital input signal x(n). The magnitude signal r(n) is a magnitude of the digital input signal x(n). The magnitude signal r(n) is output to the node 507. The magnitude logic 504 (and any magnitude logic subsequently described) can determine the magnitude signal r(n) by determining the square root of the sum of the real part of the signal input to the magnitude logic 504 squared and the imaginary part of the signal input to the magnitude logic 504 squared (e.g., generally, $|x| = \sqrt{(Re\{x\})^2 + (Im\{x\})^2}$).

The DPD path 510 includes a DPD sub-circuit 512, IIR filter 520, thermal tracking circuitry 530, and multiplier 508. The DPD sub-circuit 512 receives the digital input signal x(n), process the digital input signal x(n) to compensate for memoryless or short term memory effects, and outputs a distorted signal $z_{IIR}$(n) to a respective input node of the multiplier 508 that is coupled to an output node of the DPD sub-circuit 512.

The DPD sub-circuit 512 is implemented based on a memoryless and/or memory polynomial model or Volterra model to compensate for memoryless and/or short term memory effects of the PA 206. The adaptation circuit 216 adaptively configures the DPD sub-circuit 512 via one or more parameters of the DPD sub-circuit 512. The one or more parameters are stored in the parameter buffer 218. The one or more parameters include one or more coefficients for a memory polynomial model used by the DPD sub-circuit 512.

The IIR filter 520 receives the magnitude signal r(n) and passes the magnitude signal r(n) through the transfer function of the IIR filter 520. Further, the IIR filter 520 outputs a digital response signal $r_{IIR}$(n) to the node 527. The transfer function of the IIR filter 520 implements one or more parameters that compensate for memory effects of the PA 206. As illustrated in FIG. 5, the IIR filter 520 utilizes the parameter $\alpha$ to compensate for memory effects of the PA 206. In other examples, the IIR filter 520 utilizes more than one parameter to compensate for memory effects of the PA 206. In some examples, the adaptation circuitry 216 adaptively configures the IIR filter 520. For example, the adaptation circuitry 216 adaptively configures the IIR filter 520 via a parameter for the IIR filter 520 (e.g., $\alpha$), which can be stored in the parameter buffer 218. The parameter may be a coefficient of various functions, for example, functions that modify the input digital signal x(n) such that distortions within the PA 206 are offset. In one example, the parameter may be coefficients for a memory polynomial model used by the IIR filter 520.

The IIR filter 520 includes multiplier 522, adder 524, multiplier 526 and a delay unit 528. The magnitude signal r(n) is received at an input node of the multiplier 522 via the node 507, which multiplies the magnitude signal r(n) with parameter $\alpha$, generating signal $\alpha * r(n)$. The signal $\alpha * r(n)$ generated by the multiplier 522 is output to an input node of the adder 524. The adder 524 further receives an output of the multiplier 526 via a respective input node. The adder 524 generates the signal $r_{IIR}(n)$ from the output signal of the multiplier 522 and the output signal of the multiplier 526. The delay unit 528 receives the signal $r_{IIR}(n)$ via an input node electrically connected to the node 527. The delay unit 528 outputs a delayed signal via an output node of the delay unit 528 onto the node 529. For example, the delay unit 528 delays the response signal $r_{IIR}(n)$ by one or more time periods. In some examples, the delay unit 528 delays the response signal $r_{IIR}(n)$ by one time period $z^{-1}$. In such examples, the delayed response signal $r_{IIR}(n)*z^{-1}=r_{IIR}(n-1)$ is output by the delay unit 528. The delay unit 528 includes one or more buffers, one or more flip-flops, or the like, which further can have multiple taps that are selectable to output a signal with a desired delay. An input node of the multiplier 526 receives the delayed signal $r_{IIR}(n)*z^{-1}$ via the node 529. The multiplier 526 multiples the delayed signal with "1-α" to produce signal $(1-\alpha)*r_{IIR}(n)*z^{-1}$.

The multiplier 508 receives the signal $z_{IIR}(n)$ from an output node of the DPD sub-circuit 512 and the signal $r(n)_{IIR}$ from the node 527 via respective input nodes. The multiplier 508 multiplies the signals $z_{IIR}(n)$ and $r_{IIR}(n)$ with each other, generating $z_{IIR}(n)*r_{IIR}(n)$. The output signal of the multiplier 508 is output via an output node of the multiplier 508 to an input node of the adder 506. The adder 506 adds the signal $z_{main}(n)$ received from an output node of the DPD sub-circuit 502 with the output signal (e.g., $z_{IIR}(n)*r_{IIR}(n)$) provided by the multiplier 508 and generates signal z(n) which is provided to intermediate node 224.

The thermal tracking circuitry 530 includes subtractor 538, adder 532, multiplier 534, delay unit 536, and multiplier 537. The thermal tracking circuitry 530, along with the adaptation circuitry 216, compensates for changes in the response of PA 206 due to thermal effects. For example, the output signal of the adder 532 of the thermal tracking circuitry 530 is multiplied with the signal $z_{IIR}(n)$ to generate an adjustment signal $u_\alpha$ which is compared against input signal x(n) and response signal y(n) to determine whether to update parameter α.

The subtractor 538 receives the magnitude signal r(n) via the node 507 via a first respective input node and the delayed signal $r_{IIR}(n-1)$ via the node 529 via a second respective input node. The subtractor 538 subtracts the delayed signal $r(n-1)_{IIR}$ from the magnitude signal r(n) to generate a subtractor output signal $r(n)-r_{IIR}(n-1)$ that is output via an output node to an input node of the adder 532. The adder 532 adds the subtractor output signal (e.g., $r(n)-r_{IIR}(n-1)$) with the output signal of the multiplier 534 to obtain a thermal response signal t(n). The thermal response signal t(n) is fed back through the delay unit 536. An input node of the delay unit 536 receives the thermal response signal t(n) of the adder 532 from the node 531 and generates a delayed thermal response signal $t(n)*z^{-1}=t(n-1)$ that is output to an input node the multiplier 534 via an output node of the delay unit 536. The delay unit 536 is configured similar to that of the delay unit 528. The multiplier 534 multiplies the delayed signal t(n-1) with 1-α to generate $t(n-1)*(1-\alpha)$. The adder 532 adds $t(n-1)*(1-\alpha)$ with $r(n)-r_{IIR}(n-1)$ to generate the thermal response signal t(n) (e.g., $t(n)=r(n)-r_{IIR}(n-1)+t(n-1)*(1-\alpha)$).

The multiplier 537 receives the thermal response signal t(n) from the node 531 via a first input node and the signal $z_{IIR}(n)$ from the node 509 via a second input node. The multiplier 537 multiplies the signal t(n) with the signal $z_{IIR}(n)$ to generate the adjustment signal $u_\alpha$ output on node 540.

The adaptation circuitry 216 receives the adjustment signal $u_\alpha$ from the node 540 at a respective input node, the digital input signal x(n) from the node 222 via a second input node, and the response signal y'(n) from the signal processing circuitry 550 via a third input node. The signal processing circuitry 550 receives the output signal y(t) and generates the response signal y(n) from the output signal y(t). The signal processing circuitry 550 includes one or more of the attenuation circuitry 208, ADC 210, gain calibration circuitry 212, and alignment circuitry 214 as is described with regard to FIG. 2.

The adaptation circuitry 216 generates an updated parameter α' from the adjustment signal $u_\alpha$, the digital input signal x(n), and the response signal y'(n). The adaptation circuitry 216 adjusts parameter a such that a difference (error) between response signal y'(n) and digital input signal x(n) is mitigated. Changes in operating temperature result in a difference between the digital input signal x(n) and the response signal y'(n). For example, error(n)=x(n)-y'(n). Further, the larger the difference (error) between digital input signal x(n) and response signal y'(n) with reference to $u_\alpha$, the more parameter α is adjusted.

In one or more examples, the DPD circuitry 202 output error due to a change in α is:

$$r_{IIR}(n)=(1-\alpha)*r_{IIR}(n-1)+\alpha*r(n), \text{ and}$$

$$\frac{\partial r_{IIR}(n)}{\partial \alpha} = (1-\alpha)*\frac{\partial r_{IIR}(n-1)}{\partial \alpha} + (r(n) - r_{IIR}(n-1)).$$

Further, let $$u_\alpha(n) = z_{IIR}(n) * \frac{\partial r_{IIR}(n)}{\partial \alpha},$$

the error between the analog output signal y(t) of the PA 206 and the digital input signal x(n) is:

$$\text{error}(n)=u_\alpha(n)*\Delta\alpha, \text{ where}$$

$$\Delta\alpha = \frac{\sum_{n=1}^{N} u_\alpha^*(n) * \text{error}(n)}{\sum_{n=1}^{N} u_\alpha^*(n) * u_\alpha(n)},$$

for N observed samples. The signal t(n) in FIG. 5 and signal s(n) in FIG. 6 are equal to $$\frac{\partial r_{IIR}(n)}{\partial \alpha}.$$

In the above equation, $u^*_\alpha(n)$ is the conjugate of $u_\alpha(n)$. The adjusted parameter is determined based on:

$$\alpha_{i+1}=\alpha_i+\Delta\alpha$$

Figure 6:
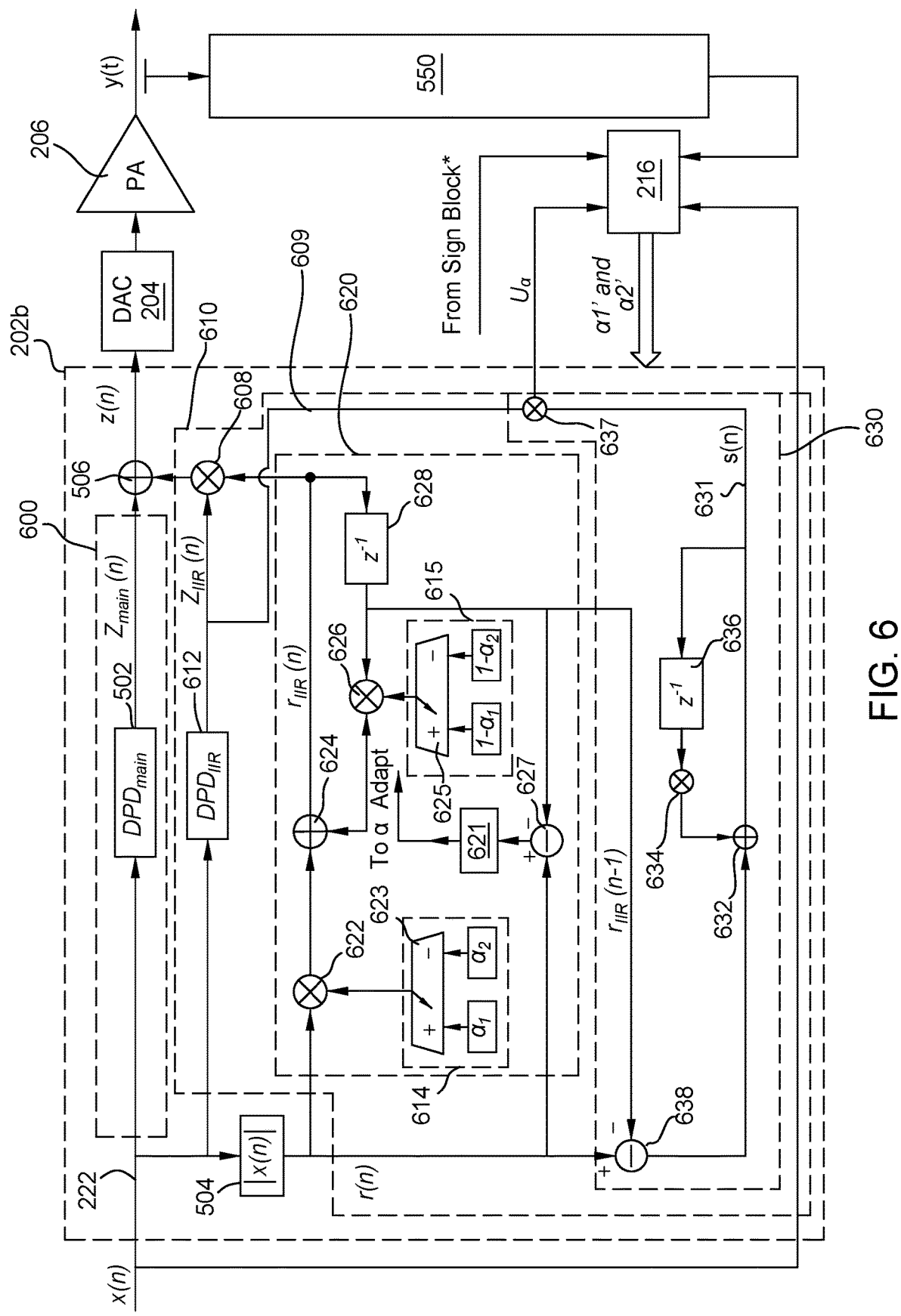
FIG. 6 is a schematic of DPD circuits that can be implemented as a DPD circuit according to some examples.

FIG. 6 illustrates a DPD circuitry 202b implemented to compensate for effects in the PA 206. The DPD circuitry 202b pre-distorts a signal according to a predetermined model, and the signals output by DPD paths 600 and 610 are multiplied and/or added to form the digital intermediate signal z(n). The DPD circuitry 202b includes parallel DPD paths 600 and 610, magnitude logic 504, and an adder 506. The path 600 is similar to the path 500 of FIG. 5. For example, the DPD path 600 includes DPD sub-circuit 502 having an output node electrically connected to an input node of the adder 506.

The DPD path 610 includes DPD sub-circuit 612, IIR filter 620, and thermal tracking circuitry 630. The DPD sub-circuit 612 is configured similar to that of the DPD sub-circuit 512. For example, an output node of the DPD sub-circuit 612 is electrically connected to an input node of the multiplier 608 and generates a pre-distorted signal from x(n) received via node 222.

The IIR filter 620 includes selection circuit 614, selection circuit 615, sign bit determination circuit 621, multiplier 622, adder 624, multiplier 626, subtractor 627, and delay unit 628.

The selection circuit 614 includes a multiplexer 623, and the selection circuit 615 includes a multiplexer 625. Respective control input nodes of the multiplexers 623, 625 are electrically connected to the output node of the sign bit determination circuit 621 and receive the sign bit output by the sign bit determination circuit 621.

A first input node of the multiplexer 623 is coupled to a storage element of the parameter buffer 218 that stores the parameter $\alpha_1$, and a second input node of the multiplexer 623 is coupled to a storage element of the parameter buffer 218 that stores the parameter $\alpha_2$. The storage element is a memory element, such as static random access memory (SRAM), of the parameter buffer 218. An output node of the multiplexer 623 is the output node of the first selection circuit 614 and is coupled to the respective input node of the multiplier 622.

The multiplexer 623 outputs the signal on the first input node of the multiplexer 623 (e.g., the parameter $\alpha_1$) when the signal on the control input node of the multiplexer 623 is "0" (e.g., when the sign bit is "0") and is configured to output the signal on the second input node of the multiplexer 623 (e.g., the second alpha parameter $\alpha_2$) when the signal on the control input node of the multiplexer 623 is "1" (e.g., when the sign bit is "1").

A first input node of the multiplexer 625 is coupled to a storage element of the parameter buffer 218 that stores the parameter "$1-\alpha_1$", and a second input node of the multiplexer 625 is coupled to a storage element of the parameter buffer 218 that stores the parameter "$1-\alpha_2$". An output node of the multiplexer 625 is the output node of the second selection circuit 615 and is electrically connected to the respective input node of the multiplier 626. The multiplexer 625 outputs the signal on the first input node of the multiplexer 625 (e.g., the first beta parameter $1-\alpha_1$) when the signal on the control input node of the multiplexer 625 is "0" (e.g., when the sign bit is "0") and outputs the signal on the second input node of the multiplexer 625 (e.g., the second beta parameter $1-\alpha_1$) when the signal on the control input node of the multiplexer 625 is "1" (e.g., when the sign bit is "1").

The subtractor 627 is configured to subtract the delayed digital response signal $z^{-1}*r_{IIR}(n)$ from the magnitude signal r(n) (or |x(n)|) to obtain a difference signal $r(n)-z^{-1}*r_{IIR}(n)$, and to output the difference signal $r(n)-z^{-1}*r_{IIR}(n)$ to the sign bit determination circuit 621. The sign bit determination circuit 621 is configured to identify and output the sign bit of the difference signal $r(n)-z^{-1}*r_{IIR}(n)$ to the first selection circuit 614 and the second selection circuit 615. The sign bit determination circuit 621 can be any connection and/or logic (e.g., a comparator) that propagates the sign bit of the difference signal $r(n)-z^{-1}*r_{IIR}(n)$. Hence, when the magnitude signal r(n) is greater than the digital response signal $r_{IIR}(n-1)$, the sign bit of the difference signal $r(n)-z^{-1}*r_{IIR}(n)$ is "0", which is output to the first selection circuit 614 and the second selection circuit 615. When the digital response signal $r_{IIR}(n-1)$ is greater than the magnitude signal r(n), the sign bit of the difference signal $r(n)-z^{-1}*r_{IIR}(n)$ is "1", which is output to the first selection circuit 614 and the second selection circuit 615.

The first selection circuit 614 is configured to selectively output a first parameter $\alpha_1$ or a second parameter $\alpha_2$ based on whether the sign bit output by the sign bit determination circuit 621 is "0" or "1". Similarly, the second selection circuit 615 is configured to selectively output a third parameter $1-\alpha_1$ or a fourth parameter $1-\alpha_2$ based on whether the sign bit output by the sign bit determination circuit 621 is "0" or "1". When the sign bit is "0", the first selection circuit 614 and the second selection circuit 615 output the first and third fourth parameters $\alpha_1$, $1-\alpha_1$, respectively. When the sign bit is "1", the first selection circuit 614 and the second selection circuit 616 output the second parameters $\alpha_2$, $1-\alpha_2$, respectively. Other configurations can be implemented, such as by switching when parameters are selectively output.

As indicated, the sign bit is "0" when the magnitude signal r(n) is greater than the digital response signal $r_{IIR}(n-1)$, which further indicates that the PA 206 will be in a charging mode with respect to the gate-lag model and the drain-lag model. Hence, the first alpha parameter $\alpha_1$ that is output when the sign bit is "0" corresponds to the time constant of the charging mode (e.g., $\tau=\tau_{CHA}=R_{CHA}*C$, with values of $R_{CHA}$ and C depending on whether the IIR filter is modeled for the gate-lag model or the drain-lag model). As indicated, the sign bit is "1" when the digital response signal $r_{IIR}(n-1)$ is greater than the magnitude signal r(n), which further indicates that the PA 206 will be in an emission mode with respect to the gate-lag model and the drain-lag model. Hence, the second alpha parameter $\alpha_2$ that is output when the sign bit is "1" corresponds to the time constant of the emission mode (e.g., $\tau=\tau_{EMI}=(R_{CHA}\|R_{EMI})*C$ or $\tau=\tau_{EMI}=R_{EMI}*C$, depending on whether the IIR filter is modeled for the gate-lag model or the drain-lag model, respectively).

In one or more examples, selectively outputting the first or second alpha parameters $\alpha_1$, $\alpha_2$ implements the selected alpha parameter $\alpha$ in the transfer function of the IIR filter, which is configured to compensate for the different time constants of the charging mode and emission mode of the given model. Similarly, selectively outputting the parameters $1-\alpha_1$, $1-\alpha_2$ implements the selected parameter in the transfer function of the IIR filter, which is configured to compensate for the different time constants of the charging mode and emission mode of the given model.

The signal output by the multiplexer 623 is received at a first input node of the multiplier 622. A second input node of the multiplier 622 receives the magnitude signal r(n) generated by the magnitude logic 504 from input digital signal x(n). The multiplier 622 multiplies the magnitude signal r(n) with the output of the multiplexer 623.

The signal output by the multiplexer 625 is received at an input node of the multiplier 626. A second input node of the multiplier 626 receives an output signal from an output node the delay unit 628. The multiplier 626 multiplies the output signal of the multiplexer 625 with the output signal (delayed digital response signal $r_{IIR}(n-1)$) of the delay unit 628.

The adder 624 receives, at a first input node, the output signal of the multiplier 622, and, at a second input node, the output signal of the multiplier 626. The adder 624 adds the output signal of the multiplier 622 with the output signal of the multiplier 626 and generates digital response signal $r_{IIR}(n)$.

An input node of the delay unit 628 is electrically connected to an output node of the adder 624 and receives the digital response signal $r_{IIR}(n)$. The delay unit 628 generates the delayed digital response signal $r_{IIR}(n-1)$ from the digital response signal $r_{IIR}(n)$.

A first input node of the multiplier 608 is electrically connected to the output node of the adder 624 and receives the digital response signal $r_{IIR}(n)$. A second input node of the multiplier 608 is electrically connected to the output node of the DPD sub-circuit 612 and multiplies the output signal generated by the DPD sub-circuit 612 with the digital response signal $r_{IIR}(n)$.

A first input node of the adder 506 is electrically connected to an output node of the DPD sub-circuit 502, and a second input node of the adder 506 is electrically connected to an output node of the multiplier 608. The adder 506 adds the output signal generated by the DPD sub-circuit 502 with the output signal of the multiplier 608 to generate digital signal z(n).

The thermal tracking circuitry 630 includes subtractor 638, adder 632, multiplier 634, delay unit 636, and multiplier 637. The thermal tracking circuitry 630 compensates for changes in the response of PA 206 due to thermal effects (e.g., changes in an operating temperature of the corresponding communication system). For example, the output signal of the adder 632 of the thermal tracking circuitry 630 is multiplied within the signal $z_{IIR}(n)$ to generate adjustment signal $u_\alpha$ which is compared against signals x(n) and y(n) to determine whether or not to update parameters $\alpha_1$, $\alpha_2$.

The subtractor 638 receives the magnitude signal r(n) via a first respective input node electrically connected to an output node of the magnitude logic 504, and the delayed digital response signal $r_{IIR}(n-1)$ via a second respective input node electrically connected to an output node of the delay unit 628. The subtractor 638 subtracts the delayed signal $r_{IIR}(n-1)$ from the magnitude signal r(n) to generate a subtractor output signal $r(n)-r_{IIR}(n-1)$ that is output via an output node to an input node of the adder 632. The adder 632 adds the subtractor output signal $r(n)-r_{IIR}(n-1)$ with the output signal of the multiplier 634 to generate the thermal response signal s(n). The thermal response signal s(n) is fed back through the delay unit 636 to generate $s(n)*z^{-1}$ (or s(n−1)). The multiplier 634 multiplies s(n−1) with output of the multiplexer 625 (e.g., $(1-\alpha_1)$ or $(1-\alpha_2)$). The multiplier 634 generates $(1-\alpha_1)*s(n-1)$ or $(1-\alpha_2)*s(n-1)$ depending on the state of the multiplexer 625. The output of the multiplier 634 is received at a second input node of the adder 632 from an output node of the multiplier 634. The delay unit 636 is configured similar to that of the delay unit 536.

The adder 632 adds $(1-\alpha_1)*s(n-1)$ or $(1-\alpha_2)*s(n-1)$ with $r(n)-r_{IIR}(n-1)$ to generate the output s(n) (e.g., $s(n)=(1-\alpha_1)*s(n-1)+r(n)-r_{IIR}(n-1)$ or $s(n)=(1-\alpha_2)*s(n-1)+r(n)-r_{IIR}(n-1)$). The thermal response signal s(n) of the adder 632 is output to node 631.

The multiplier 637 receives the thermal response signal s(n) from the node 631 via a first input node and the signal $z_{IIR}(n)$ from the node 609 via a second input node. The multiplier 637 multiplies the signal s(n) with the signal $z_{IIR}(n)$ to generate digital signal $u_\alpha$ output from the multiplier 637.

The adaptation circuitry 216 receives the digital signal $u_\alpha$ from the output node of the multiplier 637 at a respective input node, the digital input signal x(n) from the node 222 via a second input node, and the response signal y(n) from the signal processing circuitry 550 via a third input node. The adaptation circuitry 216 further receives the output of the sign bit determination circuit 621.

The adaptation circuitry 216 generates updated parameters $\alpha_1'$ and $\alpha_2'$ from signal $u_\alpha$, the digital input signal x(n), the response signal y(n), and the output of the sign bit determination circuit 621. The adaptation circuitry 216 adjusts $\alpha_1$ and $\alpha_2$ such that difference (error) between response signal y(n) and digital input signal x(n) is mitigated.

When the output of the sign bit determination circuit 621 is positive, $\alpha_1$ is updated based on:

$$\Delta\alpha^1 = \frac{\sum_{n=1}^{N} u_\alpha^*(n^+) * \text{error}(n^+)}{\sum_{n=1}^{N} u_\alpha^*(n^+) * u_\alpha(n^+)},$$

where $$\alpha_{i+1}^1 = \alpha_i^1 + \Delta\alpha^1.$$

Samples taken when the output of the sign bit determination circuit 621 is positive are represented by $n^+$ in the above equation.

When the output of the sign bit determination circuit 621 is negative, $\alpha_2$ is updated based on:

$$\Delta\alpha^2 = \frac{\sum_{n=1}^{N} u_\alpha^*(n^-) * \text{error}(n^-)}{\sum_{n=1}^{N} u_\alpha^*(n^-) * u_\alpha(n^-)},$$

where $$\alpha_{i+1}^2 = \alpha_i^2 + \Delta\alpha^2.$$

Samples taken when the output of the sign bit determination circuit 621 is negative are represented by $n^-$ in the above equation.

In various examples, the DPD circuitry 202a and/or the DPD circuitry 202b may include more than two DPD paths. For example, the DPD circuitry 202a may include two or more DPD paths configured similar to that of DPD path 510. In such examples, the output of each of the DPD paths is multiplied to form the intermediate digital signal z(n). For example, the DPD circuitry 202b may include two or more DPD paths configured similar to that of DPD path 610. In such examples, the output of each of the DPD paths is combined to form the intermediate digital signal z(n).

Figure 7A:
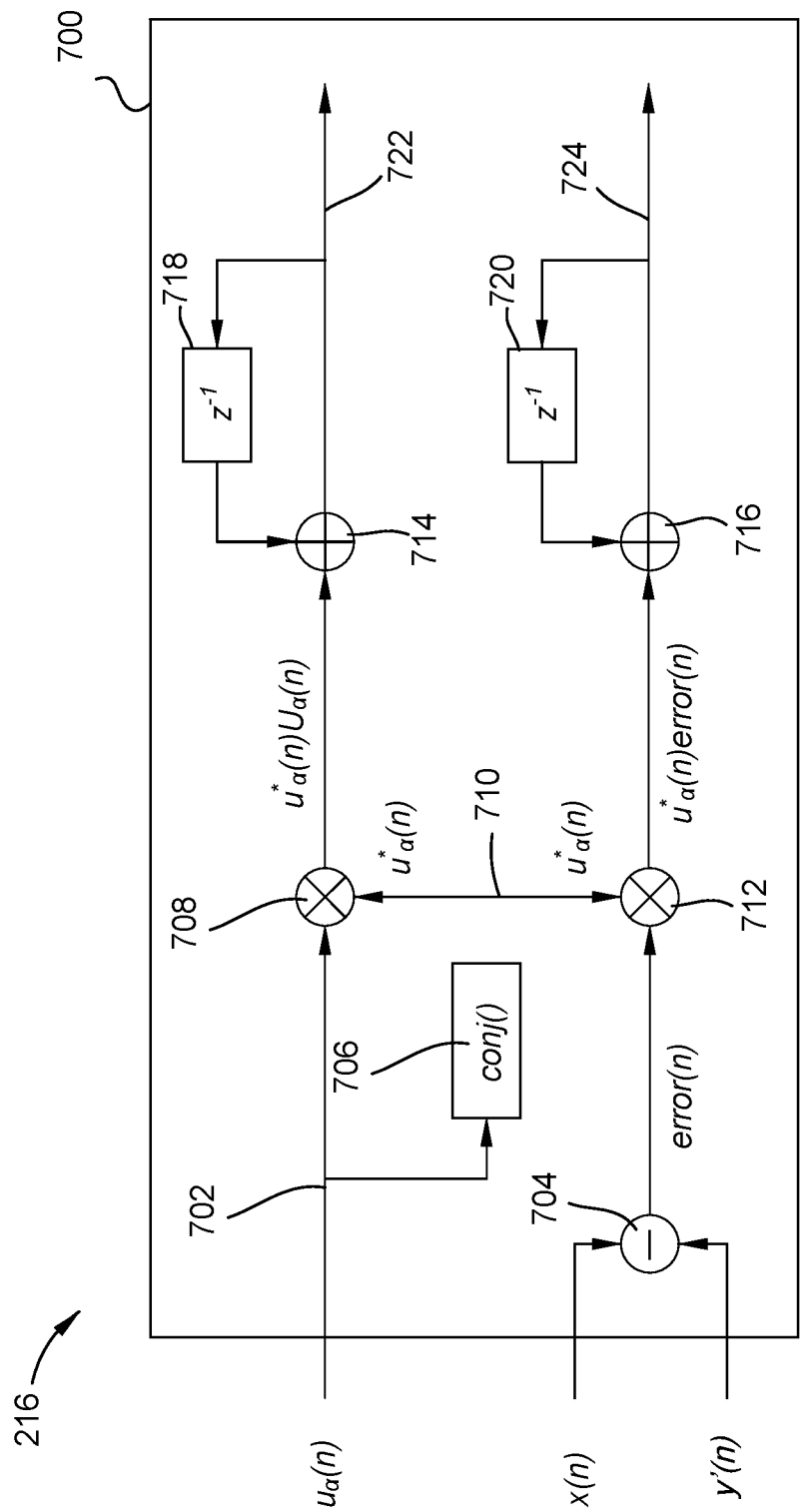
FIG. 7A is a schematic of an adjustment circuitry according to some examples.

FIG. 7A illustrates example circuitry of the adaptation circuitry 216. The adaptation circuitry 216 includes determination circuitry 700 subtractor 704, conjugate circuit block 706, multiplier 708, multiplier 712, adder 714, adder 716, delay unit 718, and delay unit 720. The node 702 is electrically connected to the output of the multiplier 537 of FIG. 5 or multiplier 637 of FIG. 6. The conjugate circuit block 706 receives the adjustment signal $u_\alpha$ ($u_\alpha(n)$) and generates the conjugate signal $u_a^*(n)$ and outputs the conjugate signal $u^*_\alpha(n)$ on node 710. The multiplier 708 receives the adjustment signal $u_\alpha$ from the node 702 and receives the conjugate signal $u_a^*(n)$ from the node 710. The multiplier 708 multiplies the adjustment signal $u_\alpha$ with the conjugate signal $u^*_\alpha(n)$ to generate the signal $u^*_\alpha(n)u_\alpha(n)$. The output node of the multiplier 708 is electrically coupled to an input node of the adder 714. Further, another input node of the adder 714 is electrically coupled to an output node of the delay unit 718 and receives a delayed response signal $(\Sigma_{m=1}{}^{n}u^*_\alpha(m)u_\alpha(m))z^{-1}=\Sigma_{m=1}{}^{n-1}u^*_\alpha(m)u_\alpha(m)$. The adder 714 generates summation signal $\Sigma_{n=1}{}^{N}u^*_\alpha(n)u_\alpha(n)$ by adding the delayed response signal $\Sigma_{m=1}{}^{n-1}u^*_\alpha(m)u_\alpha(m)$ with the signal $u^*_\alpha(n)u_\alpha(n)$. The summation signal $\Sigma_{n=1}{}^{N}u^*_\alpha(n)u_\alpha(n)$ is output on node 722.

The delay unit 718 outputs the delayed response signal $(\Sigma_{m=1}{}^{n}u^*_\alpha(m)u_\alpha(m))z^{-1}$. For example, the delay unit 718 delays the output of the adder 714 by one or more time periods. In one example, the delay unit 718 delays the output of the adder 714 by one time period $z^{-1}$.

The subtractor 704 receives the digital input signal x(n) and the response signal y'(n) via first and second input nodes and subtracts the response signal y'(n) from the digital input signal x(n) to generate the error signal error(n). An input node of the multiplier 712 receives the error signal error(n) from an output node of the subtractor 704 and the conjugate signal $u^*_\alpha(n)$ from the node 710. The multiplier 712 multiplies the error signal error(n) with the conjugate signal $u^*_\alpha(n)$ to generate the signal $u^*_\alpha(n)$error(n). An output node of the multiplier 712 is electrically connected to an input node of the adder 716. Further, another input node of the adder 716 is electrically coupled to an output node of the delay unit 720 and receives a delayed response signal $(\Sigma_{m=0}{}^{n}u^*_\alpha(m)\text{error}(m))z^{-1}=\Sigma_{m=}{}^{n-1}u^*_\alpha(m)\text{error}(m)$. The adder 716 generates summation signal $\Sigma_{n=1}{}^{N}u^*_\alpha(n)\text{error}(n)$ by adding the delayed response signal $\Sigma_{m=0}{}^{n-1}u^*_\alpha(m)\text{error}(m)$ with the signal $u^*_\alpha(n)\text{error}(n)$. The summation signal $\Sigma_{n=1}{}^{N}u^*_\alpha(n)\text{error}(n)$ is output on node 724.

An updated parameter $\alpha'$ ($\Delta\alpha$), is determined by dividing $\Sigma_{n=1}{}^{N}u^*_\alpha(n)u_\alpha(n)$ by $\Sigma_{n=1}{}^{N}u^*_\alpha(n)\text{error}(n)$.

Figure 7B:
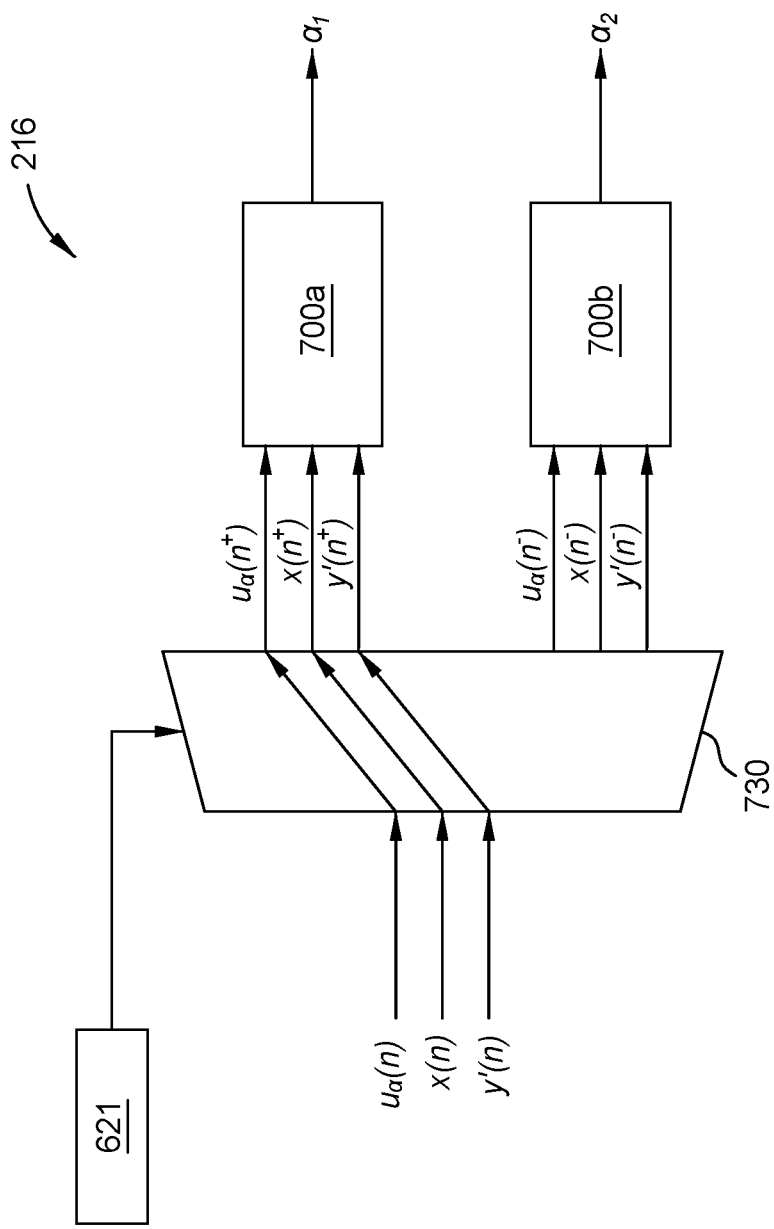
FIG. 7B is a schematic of an adjustment circuitry according to some examples.

FIG. 7B another embodiment of the adaptation circuitry 216. In the embodiment of FIG. 7B, the adaptation circuitry 216 includes selector 730, and determination circuitries 700A and 700B. The determination circuitries 700A and 700B are configured similar to and function similar to that of the determination circuitry 700 of FIG. 7A. As illustrated in FIG. 7B, the adaptation circuitry 216 includes switching element 730 that is configured to selectively couple the signals $u_\alpha(n)$, x(n), and y'(n) with the inputs of the determination circuitry 700A and 700B. For example, based on the sign bit output by the determination circuit 621 being positive (+), the switching element 730 couples the signals $u_\alpha(n)$, x(n), and y'(n) with the inputs of the determination circuitry 700A. Further, the determination circuitry 700A outputs $\alpha_1$ when the signals $u_\alpha(n)$, x(n), and y'(n) are coupled with the inputs of the determination circuitry 700A. Further, based on the sign bit output by the determination circuit 621 being negative (−), the switching element 730 couples the signals $u_\alpha(n)$, x(n), and y'(n) with the inputs of the determination circuitry 700B. Further, the determination circuitry 700B outputs $\alpha_2$ when the signals $u_\alpha(n)$, x(n), and y'(n) are coupled with the inputs of the determination circuitry 700B.

Figure 8:
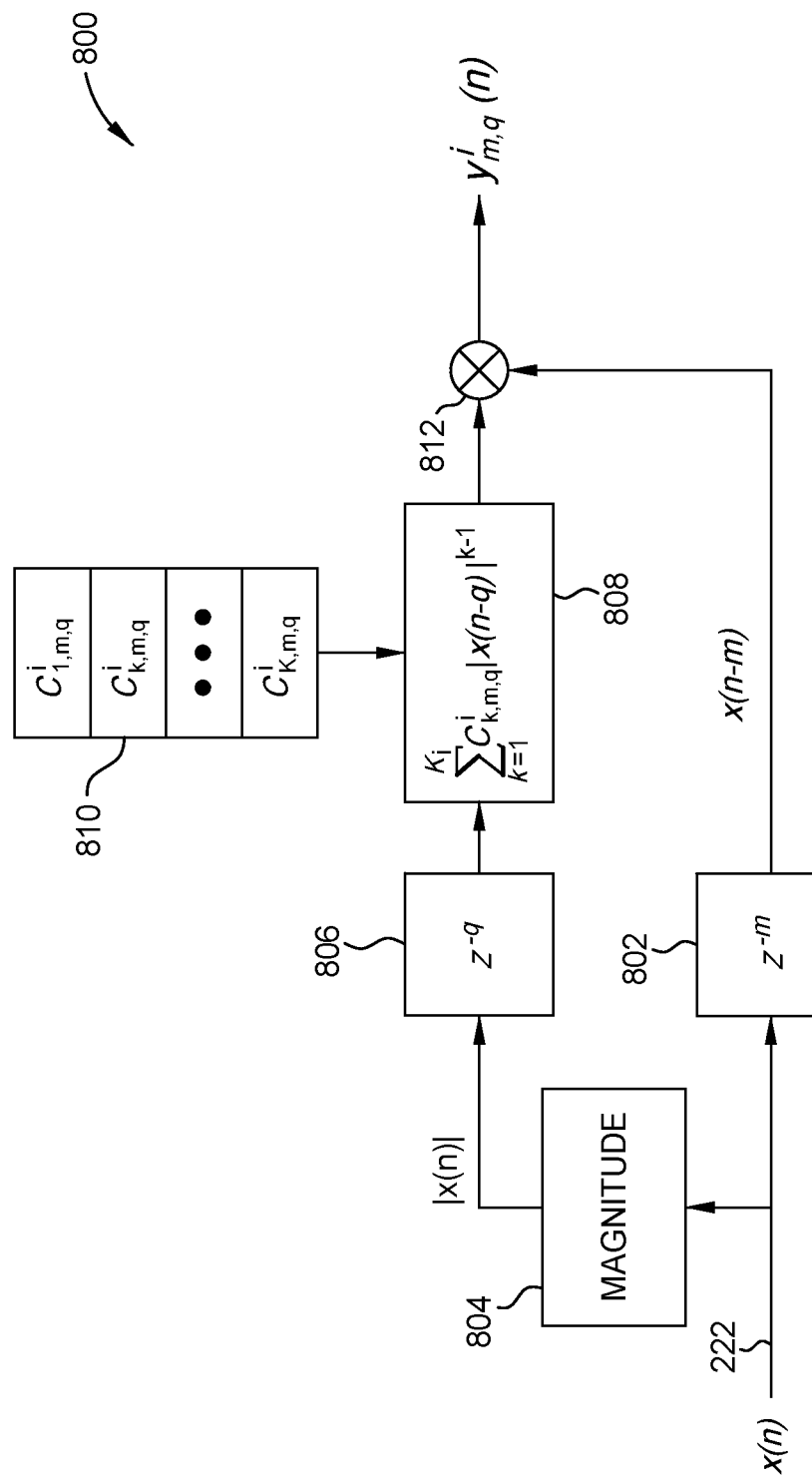
FIG. 8 is a schematic of a DPD sub-circuit according to some examples.

FIG. 8 illustrates a DPD sub-circuit 800 according to some examples. In various examples, the DPD sub-circuit 800 may be a memoryless DPD sub-circuit or a short term memory effect DPD sub-circuit. The DPD sub-circuit 800 can be implemented as the DPD sub-circuits 502, 512, 612. In some examples, one or more DPD sub-circuits 502, 512, 612 in a DPD circuit may be a memoryless DPD path implemented based on a memoryless PA model (e.g., polynomial model or Saleh's model). In some examples, one or more DPD sub-circuits 502, 512, 612 in a DPD circuit may be a short term memory effect DPD path implemented based on a short term memory effect PA model, for example, a memory polynomial model or Volterra model. In some examples, the adaptation circuitry 216 updates the parameters of the DPD sub-circuits 502, 512, 612 based on signals x(n), z(n), and/or y'(n) received by the adaptation circuitry 216.

In some examples, the DPD sub-circuit 800 is a Volterra polynomial based non-linear function data path. A DPD sub-circuit 800 may be implemented with general memory polynomials having parameters $K_i$, $M_i$, and $Q_i$, where $K_i$ is referred to as the non-linear order of the DPD sub-circuit 800 (of index i), and $M_i$ and $Q_i$ are referred to as memory taps of the DPD sub-circuit 800 (of index i). The output distorted signal $y_{m,q}^i(n)$ of the DPD sub-circuit 800 (of index i) may be expressed, for each pair of m and q, as follows:

$$y_{m,q}^i(n) = x(n-m)\sum_{k=1}^{K_i} C_{k,m,q}^i |x(n-q)|^{k-1}$$

where k, m, and q are integers, and $k=1:K_i$, $m=1:M_i$, and $q=1:Q_i$.

The DPD sub-circuit 800 of FIG. 8 includes a delay unit 802, magnitude logic 804, a delay unit 806, series logic 808, a look-up table 810, and a multiplier 812. The input node 222 is coupled to respective input nodes of the delay unit 802 and the magnitude logic 804. An output node of the delay unit 802 is coupled to an input node of the multiplier 812. An output node of the magnitude logic 804 is coupled to an input node of the delay unit 806. An output node of the delay unit 806 is coupled to an input node of the series logic 808. The series logic 808 is coupled to the look-up table 810. An output node of the series logic 808 is coupled to another input node of the multiplier 812. An output node of the multiplier 812 is the output node of the DPD sub-circuit 800. The $\text{DPD}_{main}$ (502) and $\text{DPD}_{IIR}$ (512, or 612) consist of several parallel DPD sub-circuits 800. For example, $z_{main}(n)=\Sigma_{m,q}y_{m,q}^1(n)$ and $z_{IIR}(n)=\Sigma_{m,q}y_{m,q}^2(n)$ In operation, the digital input signal x(n) is received by the DPD sub-circuit 800 at input node 222 and is input to the delay unit 802 and magnitude logic 804. The delay unit 802 is configured to delay the digital input signal x(n) by m time periods and output an m delayed digital signal x(n−m) to the multiplier 812. In some examples, m is a parameter generated by the adaptation circuitry 216 and stored, e.g., in the parameter buffer 218. The magnitude logic 804 is configured to receive the digital input signal x(n), generate a magnitude signal |x(n)| (e.g., r(n) of FIGS. 4 and 5) that is a magnitude of the digital input signal x(n), and output the magnitude signal |x(n)| to the delay unit 806. The delay unit 806 is configured to receive and delay the magnitude signal |x(n)| by q time periods and output a q delayed magnitude signal |x(n−q)| to series logic 808. In some examples, q is a parameter generated by the adaptation circuitry 216 and stored, e.g., in the parameter buffer 218. The series logic 808 is configured to receive the q delayed magnitude signal |x(n−q)|, access coefficients $C_{k,m,q}^i$ stored in the look-up table 810, perform mathematical operations to obtain a series signal $\Sigma_{k=1}^{K_i}C_{k,m,q}^i|x(n-q)|^{k-1}$, and output the series signal to the multiplier 812. In some examples, coefficients $C_{k,m,q}^i$ are parameters generated by the adaptation circuitry 216 and stored, e.g., in the parameter buffer 218, which forms at least part of the look-up table 810. The multiplier 812 is configured to receive the m delayed digital signal x(n−m) and the series signal, multiply the signals, and output the output distorted signal $y_{m,q}^i(n)$ to the output node.

The DPD sub-circuit 800 can implement different or the same coefficients and/or parameters in different instances of the DPD sub-circuit 502, 512, 612. In some examples, each of the different the DPD sub-circuits are based on different models and have different coefficients and parameters. Any appropriate parameters and coefficients can be implemented based on the model.

The adaptation circuitry 216 can be configured to generate the parameters and coefficients of the DPD circuitry 202, such as coefficients and parameters of DPD sub-circuits 502, 512, 612 alpha parameters of IIR filter 520, 620, and any other function circuit. The adaptation circuitry 216 can implement a least squares error (LSE) algorithm to determine the coefficients and parameters. The adaptation circuitry 216 can implement an iterative process, where the parameters and coefficients are initialized to some initial amount, that determines coefficients and parameters for iteratively higher orders for models. The adaptation circuitry 216 can identify instances in errors between, e.g., the aligned digital output signal y'(n) and one or both of the digital input signal x(n) and digital intermediate signal z(n) (e.g., whether the error is positive or negative), to determine a charging or emission mode of the PA 206 and corresponding time constant(s) and alpha parameter(s) for IIR filter 520, 620.

The following describes a least squares adaptation to determine the coefficients by the adaptation circuitry 216. The digital output signal y(n) (which may also be the aligned digital output signal y'(n)) can be modeled as follows:

$$y(n) = \sum_{k=1,m=0}^{K,M} C_m^k x(n-m) |x(n-m)|^{k-1}$$

The adaptation circuitry 216 captures N samples of the digital input signal x(n) and the digital output signal y(n) (e.g., x(N), ..., x(1), and y(N), ..., y(1)). The above series to model y(n) can be indicated by a matric multiplication as below:

$$Y = U_x C$$

where:

$$Y = \begin{bmatrix} y(N) \\ \vdots \\ y(1) \end{bmatrix}$$

$$U_x = \begin{bmatrix} x(N) & x(N-1) & \ldots & x(N)|x(N)| & x(N-1)|x(N-1)| & \ldots & x(N-M)|x(N-M)|^{K-1} \\ & & & \ldots & & & \\ x(1) & x(0) & \ldots & x(1)|x(1)| & x(0)|x(0)| & \ldots & x(1-M)|x(1-M)|^{K-1} \end{bmatrix}$$

$$C = \begin{bmatrix} C_0^1 \\ C_1^1 \\ \vdots \\ C_0^2 \\ C_1^2 \\ \vdots \\ C_M^K \end{bmatrix}$$

The coefficients of matrix C can then be determined by multiplying the matrix inverse of the product of the complex conjugate of matrix $U_x$ and the matrix $U_x$ with the product of the complex conjugate of matrix $U_x$ and the matrix Y, as indicated below:

$$C = (U_x^H U_x)^{-1} (U_x^H Y)$$

Various circuits and logic described above can be implemented in any circuit or system. For example, the DPD circuitry 202, DAC 204, PA 206, ADC 208, alignment circuitry 214, adaptation circuitry 216, and/or parameter buffer 218 can be implemented as hardwired circuits and logic in an application specific integrated circuit (ASIC); as a system-on-chip (SoC) that includes, for example, hardwired circuit and logic and/or programmable processors or logic; and/or as a programmable logic device such as a field programmable gate array (FPGA). In some examples, the DPD circuitry 202, alignment circuitry 214, adaptation circuitry 216, and parameter buffer 218 can be implemented, at least in part, in programmable fabric of an FPGA (e.g., a RF System-on-Chip (SoC) FPGA).

Figure 9:
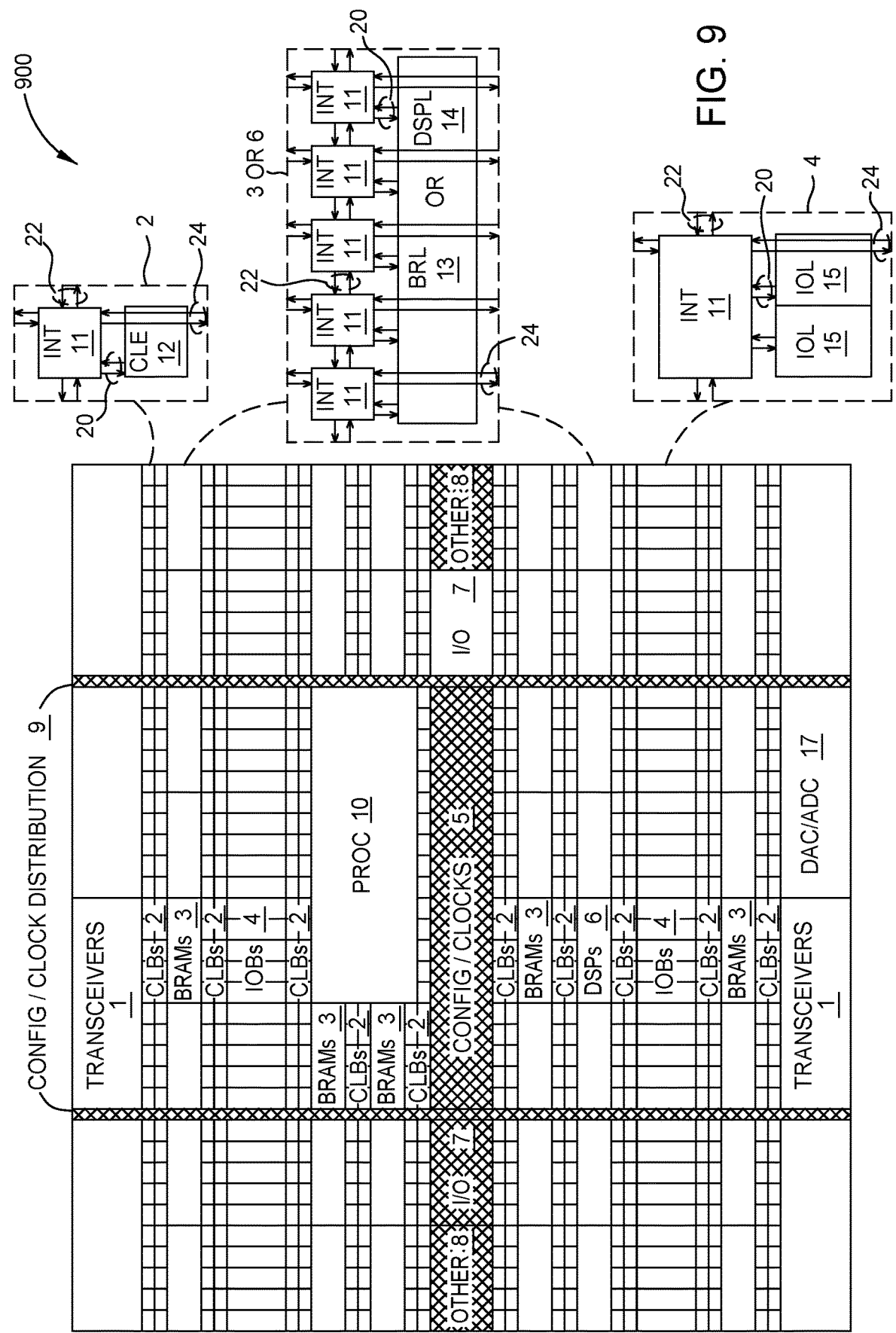
FIG. 9 is a schematic of an architecture of a field programmable gate array (FPGA) according to some examples.

FIG. 9 illustrates an architecture of FPGA 900 that includes a large number of different programmable tiles including transceivers 1, configurable logic blocks (CLBs) 2, random access memory blocks (BRAMs) 3, input/output blocks (IOBs) 4, configuration and clocking logic (CONFIG/CLOCKS) 5, digital signal processing blocks (DSPs) 6, specialized input/output blocks (I/O) 7 (e.g., configuration ports and clock ports), and other programmable logic 8 such as digital clock managers, system monitoring logic, and so forth. Some FPGAs also include dedicated processor blocks (PROC) 10. The FPGA can also include a DAC/ADC circuitry 17 (e.g., RF-class DAC and RF-class ADC), and the like.

In some FPGAs, each programmable tile can include at least one programmable interconnect element (INT) 11 having connections to input and output terminals 20 of a programmable logic element within the same tile, as shown by examples included in FIG. 9. Each programmable interconnect element 11 can also include connections to interconnect segments 22 of adjacent programmable interconnect element(s) in the same tile or other tile(s). Each programmable interconnect element 11 can also include connections to interconnect segments 24 of general routing resources between logic blocks (not shown). The general routing resources can include routing channels between logic blocks (not shown) comprising tracks of interconnect segments (e.g., interconnect segments 24) and switch blocks (not shown) for connecting interconnect segments. The interconnect segments of the general routing resources (e.g., interconnect segments 24) can span one or more logic blocks. The programmable interconnect elements 11 taken together with the general routing resources implement a programmable interconnect structure ("programmable interconnect") for the illustrated FPGA.

In an example implementation, a CLB 2 can include a configurable logic element (CLE) 12 that can be programmed to implement user logic plus a single programmable interconnect element (INT) 11. A BRAM 3 can include a BRAM logic element (BRL) 13 in addition to one or more programmable interconnect elements. Typically, the number of interconnect elements included in a tile depends on the height of the tile. In the illustrated example, a BRAM tile has the same height as five CLBs, but other numbers (e.g., four) can also be used. A DSP 6 can include a DSP logic element (DSPL) 14 in addition to an appropriate number of programmable interconnect elements. An IOB 4 can include, for example, two instances of an input/output logic element (IOL) 15 in addition to one instance of the programmable interconnect element 11. As will be clear to those of skill in the art, the actual I/O pads connected, for example, to the input/output logic element 15 typically are not confined to the area of the input/output logic element 15.

In the pictured example, a horizontal area near the center of the die is used for configuration, clock, and other control logic. Vertical columns 9 extending from this horizontal area or column are used to distribute the clocks and configuration signals across the breadth of the FPGA.

Some FPGAs utilizing the architecture illustrated in FIG. 9 include additional logic blocks that disrupt the regular columnar structure making up a large part of the FPGA. The additional logic blocks can be programmable blocks and/or dedicated logic. For example, processor block 10 spans several columns of CLBs and BRAMs. The processor block 10 can various components ranging from a single microprocessor to a complete programmable processing system of microprocessor(s), memory controllers, peripherals, and the like.

Note that FIG. 9 is intended to illustrate only an example FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 9 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

Figure 10:
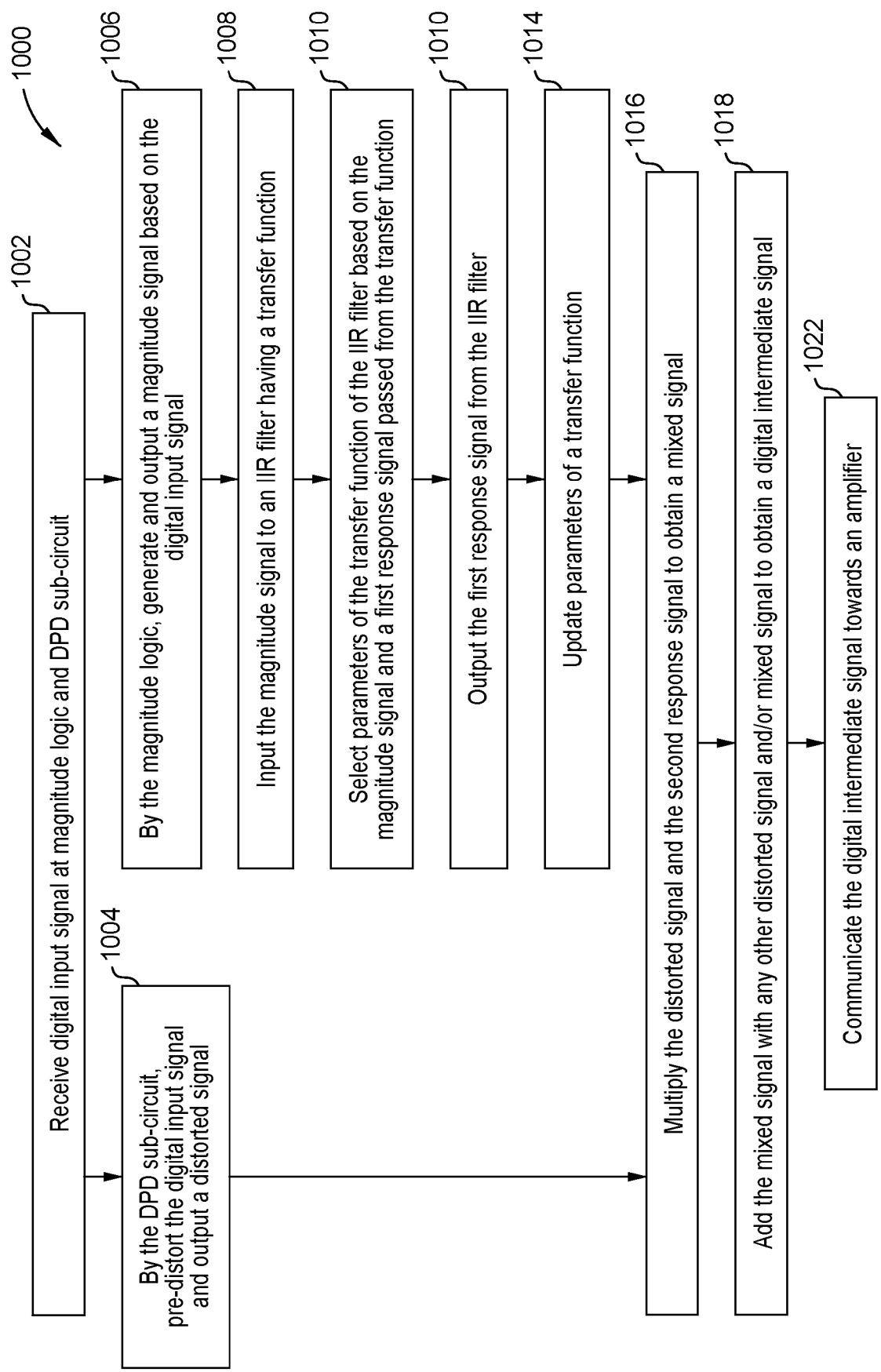
FIG. 10 is a method to process a signal to be transmitted by adding digital pre-distortion to the signal according to some examples.

FIG. 10 is a method 1000 to process a signal to be transmitted by adding digital pre-distortion to the signal according to some examples. At block 1002, a digital input signal is received at magnitude logic (e.g., magnitude logic 504) and a DPD sub-circuit (e.g., DPD sub-circuit 512, 612). At block 1004, the digital input signal is pre-distorted by the DPD sub-circuit, and a distorted signal is output from the DPD sub-circuit. The distorted signal can be generated as described above. At block 1006, the magnitude logic generates and outputs a magnitude signal based on the digital input signal. At block 1008, the magnitude signal is input to an IIR filter (e.g., IIR filter 520, 620) having a transfer function. At block 1010, parameters of the transfer function (e.g., one or more alpha parameters) are selected based on the magnitude signal and a first response signal passed from the transfer function. For example, as described above with respect to FIG. 6, alpha parameters are selected based on a sign bit of a difference signal that is a difference between the magnitude signal $|x(n)|(r(n))$ and the digital response signal $r_{IIR}(n)$. In various examples, the block 1010 is optional and is omitted. For example, with reference to FIG. 5, the block 1010 is omitted.

At block 1012, the first response signal is output from the IIR filter. At block 1014, parameters of the transfer function (e.g., one or more alpha parameters) are updated. For example, as described above, alpha parameters are updated by the adaptation circuitry 216 based on an adjustment signal generated by the thermal tracking circuitry 530, 630, the input signal, and a response signal.

At block 1016, the distorted signal (output by the DPD sub-circuit 512, 612) and the response output from the IIR filter 520,620 are multiplied to obtain a product signal. At block 1018, the product signal is added with any other distorted and/or product signal (e.g., from any other path) to obtain a digital intermediate signal (e.g., digital intermediate signal z(n)). At block 1022, the digital intermediate signal is communicated towards an amplifier (e.g., from the DPD circuitry 202a, 202b to the PA 206).

While the foregoing is directed to specific examples, other and further examples may be devised without departing from the basic scope thereof, and the scope thereof is determined by the claims that follow.

What is claimed is:

1. A transmitter for a communication system, comprising:
 a digital pre-distortion (DPD) circuit configured to generate a digital intermediate signal by compensating an input signal for distortions resulting from an amplifier, the DPD circuit including:
  an infinite impulse response (IIR) filter configured to implement a transfer function based on a first parameter; and
  thermal tracking circuitry configured to generate an adjustment signal corresponding to a thermal change of the amplifier; and
 adaptation circuitry configured to update the first parameter based on the adjustment signal, the input signal, and an output signal output by the amplifier and based on the digital intermediate signal, wherein the thermal tracking circuitry is further configured to generate a difference signal by subtracting a delayed response signal of the IIR filter from a magnitude signal of the input signal.

2. The transmitter of claim 1, wherein the thermal tracking circuitry is further configured to generate a thermal response signal by adding the difference signal with a delayed response signal of the thermal response signal multiplied by one minus the first parameter.

3. The transmitter of claim 2, wherein the DPD circuit further includes a DPD sub-circuit configured to generate a pre-distorted signal from the input signal, and wherein the thermal tracking circuitry is further configured to generate the adjustment signal by multiplying the thermal response signal with the pre-distorted signal.

4. The transmitter of claim 1, wherein the DPD circuit is implemented in programmable logic of a field programmable gate array (FPGA).

5. A transmitter for a communication system, comprising:
 a digital pre-distortion (DPD) circuit configured to generate a digital intermediate signal by compensating an input signal for distortions resulting from an amplifier, the DPD circuit including:
  an infinite impulse response (IIR) filter configured to implement a transfer function based on a first parameter; and
  thermal tracking circuitry configured to generate an adjustment signal corresponding to a thermal change of the amplifier; and
 adaptation circuitry configured to update the first parameter based on the adjustment signal, the input signal, and an output signal output by the amplifier and based on the digital intermediate signal, wherein the adaptation circuitry is further configured to update a second parameter, and wherein the IIR filter is further configured to update the transfer function by selecting one of the updated first parameter and the updated second parameter.

6. A transmitter for a communication system, comprising:
 a digital pre-distortion (DPD) circuit configured to generate a digital intermediate signal by compensating an input signal for distortions resulting from an amplifier, the DPD circuit including:

an infinite impulse response (IIR) filter configured to
implement a transfer function based on a first parameter; and
thermal tracking circuitry configured to generate an
adjustment signal corresponding to a thermal change
of the amplifier; and
adaptation circuitry configured to update the first parameter based on the adjustment signal, the input signal,
and an output signal output by the amplifier and based
on the digital intermediate signal, wherein the adaptation circuitry is further configured to:
determine a first error output based on the adjustment
signal;
determine a second error output based on a difference
between the input signal and a response signal corresponding to an output signal generated by the
amplifier that is based on the digital intermediate
signal; and
divide the first error output by the second error output
to determine a change of a value of the first parameter.

7. The transmitter of claim 6, wherein the adaptation circuitry is configured to update the first parameter by increasing or decreasing the value of the first parameter.

8. A method of processing for transmission, the method comprising:
performing digital pre-distortion on an input signal to
generate a digital intermediate signal, performing the
digital pre-distortion comprising:
outputting a first signal from an infinite impulse
response (IIR) filter, the first signal being based on
the input signal passed through the IIR filter, and a
transfer function of the IIR filter being based on a
first parameter;
generating an adjustment signal corresponding to a
change in an operating temperature of an amplifier
configured to generate an output signal based on the
digital intermediate signal;
updating the first parameter based on the adjustment
signal, the input signal, and an output signal output
by the amplifier and based on the digital intermediate
signal; and
generating a difference signal by subtracting a delayed
response signal of the IIR filter from a magnitude
signal of the input signal.

9. The method of claim 8, further comprising outputting a thermal response signal by adding the difference signal with a delayed response signal of the thermal response signal multiplied by one minus the first parameter.

10. The method of claim 9, further comprising generating a pre-distorted signal from the input signal, wherein the adjustment signal is generated by multiplying the thermal response signal with the pre-distorted signal.

11. The method of claim 8, wherein updating the first parameter includes increasing or decreasing a value of the first parameter.

12. A method of processing for transmission, the method comprising:
performing digital pre-distortion on an input signal to
generate a digital intermediate signal, performing the
digital pre-distortion comprising:
outputting a first signal from an infinite impulse
response (IIR) filter, the first signal being based on
the input signal passed through the IIR filter, and a
transfer function of the IIR filter being based on a
first parameter;
generating an adjustment signal corresponding to a
change in an operating temperature of an amplifier
configured to generate an output signal based on the
digital intermediate signal;
updating the first parameter based on the adjustment
signal, the input signal, and an output signal output
by the amplifier and based on the digital intermediate
signal;
updating a second parameter; and
updating the transfer function by selecting one of the
updated first parameter and the updated second
parameter.

13. A method of processing for transmission, the method comprising:
performing digital pre-distortion on an input signal to
generate a digital intermediate signal, performing the
digital pre-distortion comprising:
outputting a first signal from an infinite impulse
response (IIR) filter, the first signal being based on
the input signal passed through the IIR filter, and a
transfer function of the IIR filter being based on a
first parameter;
generating an adjustment signal corresponding to a
change in an operating temperature of an amplifier
configured to generate an output signal based on the
digital intermediate signal;
updating the first parameter based on the adjustment
signal, the input signal, and an output signal output
by the amplifier and based on the digital intermediate
signal;
determining a first error output based on the adjustment
signal;
determining a second error output based on a difference
between the input signal and a response signal corresponding to the output signal; and
dividing the first error output by the second error output
to determine a change of a value of the first parameter.

14. A communication system comprising:
a transmitter configured to receive an input signal to be
transmitted via an antenna, the transmitter comprising
a power amplification unit, the power amplification unit
comprising:
an amplifier;
a digital pre-distortion (DPD) circuit configured to
generate a digital intermediate signal by compensating the input signal for distortions resulting from the
amplifier and to communicate the digital intermediate signal towards the amplifier, the DPD circuit
including:
an infinite impulse response (IIR) filter configured to
implement a transfer function based on a first
parameter; and
thermal tracking circuitry configured to generate an
adjustment signal corresponding to a change in an
operating temperature of the amplifier; and
adaptation circuitry configured to update the first
parameter based on the adjustment signal, the input
signal, and an output signal output by the amplifier
and based on the digital intermediate signal, wherein
the thermal tracking circuitry is further configured to
generate a difference signal by subtracting a delayed
response signal of the IIR filter from a magnitude
signal of the input signal.

15. The system of claim 14, wherein the thermal tracking circuitry is further configured to output a thermal response signal by adding the difference signal with a delayed response signal of the thermal response signal multiplied by one minus the first parameter.

16. The system of claim 15, wherein the DPD circuit further includes a DPD sub-circuit configured to generate a pre-distorted signal from the input signal, and wherein the thermal tracking circuitry is further configured to generate the adjustment signal by multiplying the thermal response signal with the pre-distorted signal.

17. A communication system comprising:
a transmitter configured to receive an input signal to be transmitted via an antenna, the transmitter comprising a power amplification unit, the power amplification unit comprising:
an amplifier;
a digital pre-distortion (DPD) circuit configured to generate a digital intermediate signal by compensating the input signal for distortions resulting from the amplifier and to communicate the digital intermediate signal towards the amplifier, the DPD circuit including:
an infinite impulse response (IIR) filter configured to implement a transfer function based on a first parameter; and
thermal tracking circuitry configured to generate an adjustment signal corresponding to a change in an operating temperature of the amplifier; and
adaptation circuitry configured to update the first parameter based on the adjustment signal, the input signal, and an output signal output by the amplifier and based on the digital intermediate signal, wherein the adaptation circuitry is further configured to update a second parameter, and wherein the IIR filter is configured to update the transfer function by selecting one of the updated first parameter and the updated second parameter.

* * * * *